United States Patent
Jain

(10) Patent No.: US 9,401,987 B2
(45) Date of Patent: Jul. 26, 2016

(54) SYSTEMS AND METHODS TO PROVIDE CONNECTIONS TO USERS IN DIFFERENT GEOGRAPHIC REGIONS

(71) Applicant: YellowPages.com LLC, Tucker, GA (US)

(72) Inventor: Mehul Jain, Foster City, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 67 days.

(21) Appl. No.: 14/263,867

(22) Filed: Apr. 28, 2014

(65) Prior Publication Data

US 2015/0078539 A1 Mar. 19, 2015

Related U.S. Application Data

(60) Provisional application No. 61/820,636, filed on May 7, 2013.

(51) Int. Cl.
| | |
|---|---|
| *H04M 1/64* | (2006.01) |
| *H04M 3/493* | (2006.01) |
| *H04M 15/00* | (2006.01) |
| *H04M 3/42* | (2006.01) |
| *H04M 3/487* | (2006.01) |

(52) U.S. Cl.
CPC .......... *H04M 3/493* (2013.01); *H04M 3/42153* (2013.01); *H04M 3/4878* (2013.01); *H04M 15/09* (2013.01); *H04M 15/56* (2013.01);
(Continued)

(58) Field of Classification Search
CPC .. H04M 3/493; H04M 3/4931; H04M 3/4933
USPC .......................................... 379/88.01, 88.06
See application file for complete search history.

(56) References Cited

U.S. PATENT DOCUMENTS

| | | | |
|---|---|---|---|
| 6,628,772 B1* | 9/2003 | Cox ........................ | H04M 3/42 379/203.01 |
| 6,925,155 B2* | 8/2005 | Reynolds .............. | H04M 3/493 379/265.01 |

(Continued)

FOREIGN PATENT DOCUMENTS

| | | |
|---|---|---|
| KR | 1020010064661 | 7/2001 |
| KR | 1020060122559 | 11/2006 |

OTHER PUBLICATIONS

International Application No. PCT/US2008/067247, Written Opinion and International Search Report, Mar. 10, 2010.

*Primary Examiner* — Van D Huynh
(74) *Attorney, Agent, or Firm* — Alston & Bird LLP

(57) ABSTRACT

Systems and methods to provide anonymous communication connections between customers in different countries/regions and service providers. Different call-in references are configured for customers residing in different regions and/or having different language preferences. Different prices are computed for foreign customers based on a single price of a service provider and the call-in references used by the customers to initiate the anonymous connections to take into account of the international/long distance call charges. Currency conversion is performed based on exchange rates in backend payment management. Location information of service providers and customers is provided in a configurable way, based on preference, service category, without compromising privacy. Comments, feedback, and/or ratings of the service providers can be filtered for presentation to the customers, based on the location information of the service providers and/or the customer, or based on the location selection of the customers, to increase relevancy to the respective customers.

20 Claims, 25 Drawing Sheets

(52) U.S. Cl.
CPC .............. *H04M15/61* (2013.01); *H04M 15/63* (2013.01); *H04M 15/68* (2013.01); *H04M 15/8033* (2013.01); *H04M 15/8083* (2013.01); *H04M 15/842* (2013.01)

(56) References Cited

U.S. PATENT DOCUMENTS

| | | | |
|---|---|---|---|
| 7,702,084 B2 | 4/2010 | Wolmuth | |
| 8,442,827 B2* | 5/2013 | Duffield | G10L 15/187 379/88.01 |
| 2004/0156494 A1* | 8/2004 | Pines | H04M 3/4931 379/218.02 |
| 2005/0216341 A1 | 9/2005 | Agarwal et al. | |
| 2007/0038507 A1 | 2/2007 | Kumar | |
| 2007/0121846 A1 | 5/2007 | Altberg et al. | |
| 2007/0201677 A1* | 8/2007 | Bates | H04M 3/4935 379/265.01 |
| 2007/0274484 A1 | 11/2007 | Frank et al. | |
| 2008/0091435 A1* | 4/2008 | Strope | 704/277 |
| 2008/0091536 A1 | 4/2008 | Wolmuth | |
| 2008/0097845 A1 | 4/2008 | Altberg et al. | |

* cited by examiner

*141

Create Ad      [?] Help

Your ad is very important. Tell customers exactly what you're selling and why they should call you. Please review our Pay Per Call Ad Guidelines to ensure your ad is accepted and gets new customers calling your business today.

Ad Location Info

Business Name: [_____] (Sorry, no phone numbers)

☐ Use my Account Information

Address 1: [_____]

Address 2: [_____] (Optional)

City: [_____]

State: [-Select State- ▽]

Zip Code: [____] – [____]

Phone Number: ( [__] ) [__] – [____]   Enter the number where you'd like to receive calls Fax: ( [__] ) [__] – [____]

Ad Marketing Message

Millions of people online will see your ad. So, in line 1 write a strong headline explaining what you're selling. To get people calling your business, include a promotional offer in line 2. This encourages buyers to call you now! Please note: Line 1 and Line 2 must each a complete sentence. Tips for success
Examples of Promotional Offers:
 - Call today and get $5 off.
 - Free consultation – limited time.
 - Call now and save 10%.
You'll be able to include more information about your offer on the business profile page. Learn more Marketing Message Line 1: [_____] (35 characters)

Marketing Message Line 2: [_____] (35 characters)

SYSTEMS AND METHODS TO PROVIDE CONNECTIONS TO USERS IN DIFFERENT GEOGRAPHIC REGIONS

RELATED APPLICATIONS

The present application claims priority to Prov. U.S. Pat. App. Ser. No. 61/820,636, filed May 7, 2013 and entitled "Systems and Methods to Provide Connections to Users in Different Geographic Regions", the entire disclosure of which application is hereby incorporated herein by reference.

The present patent application relates to U.S. patent application Ser. No. 14/263,731, filed Apr. 28, 2014 and entitled "Systems and Methods to Customize the Presentation of Prompts to Establish Communication Connections", U.S. patent application Ser. No. 14/263,778, filed Apr. 28, 2014 and entitled "Systems and Methods to Establish Communication Connections via Mobile Application", U.S. patent application Ser. No. 14/263,807, filed Apr. 28, 2014 and entitled "Systems and Methods to Customize Interactive Voice Response (IVR) Prompts based on Information about a Caller", U.S. Pat. App. Pub. No. 2007/0189520, published on Aug. 16, 2007 and entitled "Systems and Methods to Facilitate Transition from Communication to Commerce," and U.S. Pat. App. Pub. No. 2008/0097845, published on Apr. 24, 2008 and entitled "Systems and Methods to Provide Voice Connections via Local Telephone Numbers," the entire disclosures of which applications are hereby incorporated herein by reference.

FIELD OF THE TECHNOLOGY

At least some embodiments disclosed relate to telephonic connections in general and, more specifically but not limited to, user interfaces for establishing telephonic connections.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

BRIEF DESCRIPTION OF THE DRAWINGS

The present disclosure is illustrated by way of example and not limitation in the figures of the accompanying drawings in which like references indicate similar elements.

FIG. 2 illustrates a user interface for the creation of an advertisement according to one embodiment.

DETAILED DESCRIPTION

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

Figure 1:
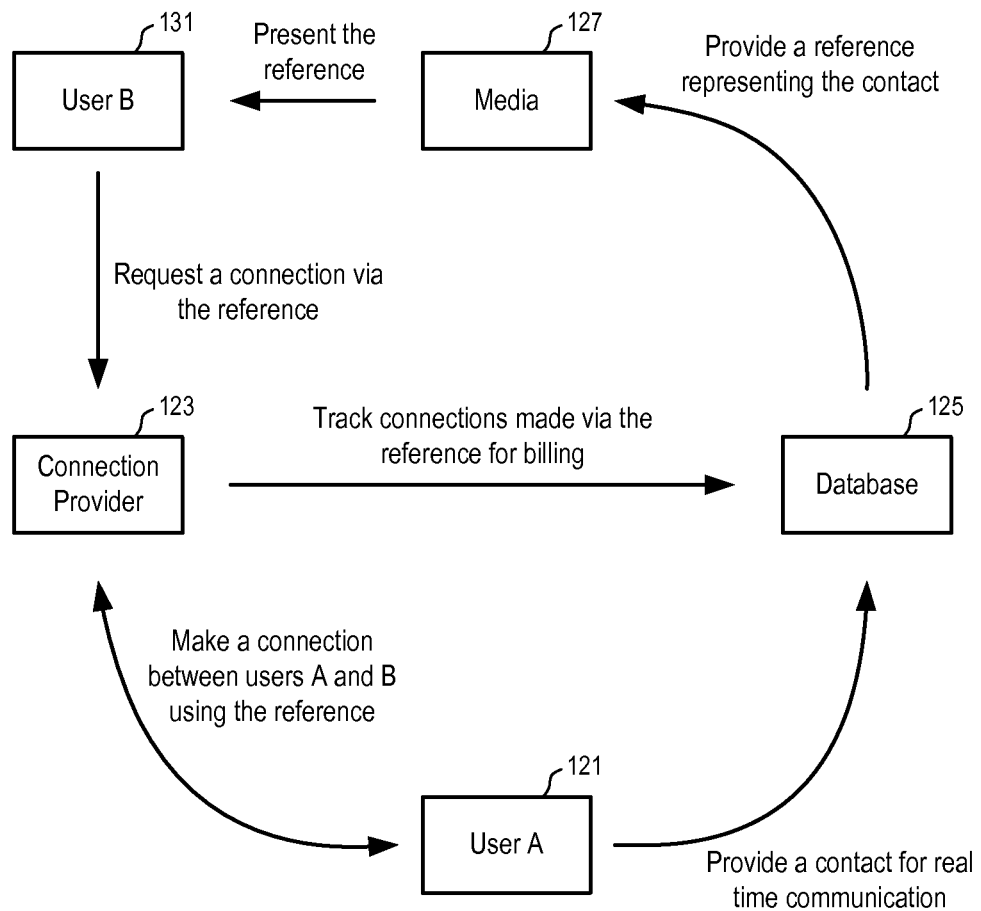
FIG. 1 shows a method to establish connections for real time communications according to one embodiment.

FIG. 1 shows a method to establish connections for real time communications according to one embodiment. In FIG. 1, user A (121) provides a contact for real time communication, such as a telephone reference of the user A. The contact can be used to establish a connection with user A (121) through a communication network. For example, the contact can be a telephone number of a landline, traditional analog telephone, a cellular phone number, a phone number with an extension, a Universal Resource Identifier (URI) such as a Session Initiation Protocol (SIP) URI, a user identifier of a VoIP application, a user identifier of an instant messaging system, etc.

The contact of the user A (121) is stored in the database (125); and a reference is assigned to represent the contact. Instead of providing the contact to customers, the reference representing the contact is provided through the media (127) to user B (131). Thus, when the user B (131) uses the reference to request a connection with the user A (121), the connections resulted from the advertisement can be tracked to evaluate the performance.

In one embodiment, advertisements can be distributed via a number of media channels operated by a number of demand partners. The reference can also be assigned to identify the demand partners and/or the media channels used to distribute the advertisements. In one embodiment, the information obtained from tracking the demand partners who are responsible for the delivery of a communication lead is used to compensate the demand partner for each delivered communication lead. Alternatively, the demand partners may be compensated according to the advertisement presentations made for the advertiser; and tracked information can be used to determine the performance and/or the cost effectiveness of the media channels.

In one embodiment, the reference can be presented via a variety of media channels, such as a virtual reality environment, newspaper, magazine, telephone directory, web search results, VoIP user terminals, interactive maps, banners, directory assistance service, online marketplace, mobile communication devices, radio, cable/satellite television, interactive television, web television, voice portal, web portal, online auction site, blog, email, bulletin board, refrigerate magnet, brochure, etc.

In FIG. 1, the user B (131) can use the reference obtained from media (127) to request the connection provider (123) to establish a connection or facilitate a communication channel for real time communications between the user A (121) and the user B (131). The connection provider uses the database (125) to determine the contact of the user A (121) and then make a connection between the user A (121) and user B (131) using the contact of the user A (121). Alternatively, the reference may include an encoded/encrypted version of the contact of the user A (121) which can be decoded/decrypted without relying upon the database (125).

In response to the user B's request for a connection, the connection provider (123) may establish two separate connections to the user A (121) and the user B (131) and then bridge the two connections to connect the user A (121) and user B (131). For example, the connection provider (123) may determine the reference from a connection established between the user B (131) and connection provider (123) and then further bridge the connection to the user A (121).

In one embodiment, the connection provider (123) may provide a separate reference to represent the user B (131) and allow the user A (121) to subsequently callback to the user B (131) via the reference that represents the user B (131), if the user A (121) is not currently available for real time communications. The connection provider (123) may schedule an appointment for the user A (121) and user B (131) for a real time communication session. The connection provider (123) may send a notification to the user A (121) to inform the user A (121) about the request for a real time communication.

In one embodiment, the connection provider (123) tracks the connections made via the reference for billing for the advertisement. For example, the connection provider (123) may charge the advertiser for each communication lead deliver to the user A (121).

A communication lead may be limited to a distinct, separate customer such that repeated calls from the same customer within a predefined time period may not be counted as separate communication leads. In one embodiment, the communication lead may also be limited by the duration of a communication session, such that a short session having a duration shorter than a predefined time period may not be counted as a communication lead, and/or a long session having a duration longer than a predefined time period may be counted as more than one communication lead.

In one embodiment, a number of communication leads may be bundled as a package for a subscription fee, or a bid price. Further, the delivery of communication leads may be bundled with an offer of a telecommunication service package. Alternatively, the advertiser may specify a bid price that is to be charged for each communication lead delivered, or a bid limit (e.g., maximum bid) which is to be resolved into an actual bid based on the bid prices of competitors in a category for a specific geographic service area.

FIG. 2 illustrates a user interface for the creation of an advertisement according to one embodiment. The user interface may be presented via web in a web browser.

In FIG. 2, an interface (141) allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation—limited time," and "Call now and save 10%."

In one embodiment, an audio and/or visual advertisement is generated based at least in part on the information submitted by the advertiser via the user interface (141) (e.g., for presentation via virtual realty, directory assistance service, search result, etc.)

In one embodiment, a short audio advertisement is generated based on the concise marketing message (e.g., two sentences, each having a length limit, such as 35 characters). The concise marketing message can be read by a human to generated a recorded audio file for a short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. In response to a request from the customer, the visual component of the advertisement can be sent to the customer via an SMS message, via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web or a virtual reality environment, the short audio advertisement can also be included; and the audio advertisement can be played automatically or after the user selects the advertisement.

In FIG. 2, the interface (141) may be implemented as a web page. Alternatively, an advertisement may submit the advertising content via a custom client application, or via a message gateway (e.g., an instant message, an email, an SMS message, etc.). In one embodiment, one or more advertisements can be uploaded into a server via a spreadsheet, or via a web service interface.

In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer, or a human announcer) when the audio advertisement is needed. In one embodiment, the machine synthesized audio recording are stored in the database for a period of time and deleted if not used after a predetermined period of time, or when the usage of the audio advertisement is lower than a threshold.

Figure 3:
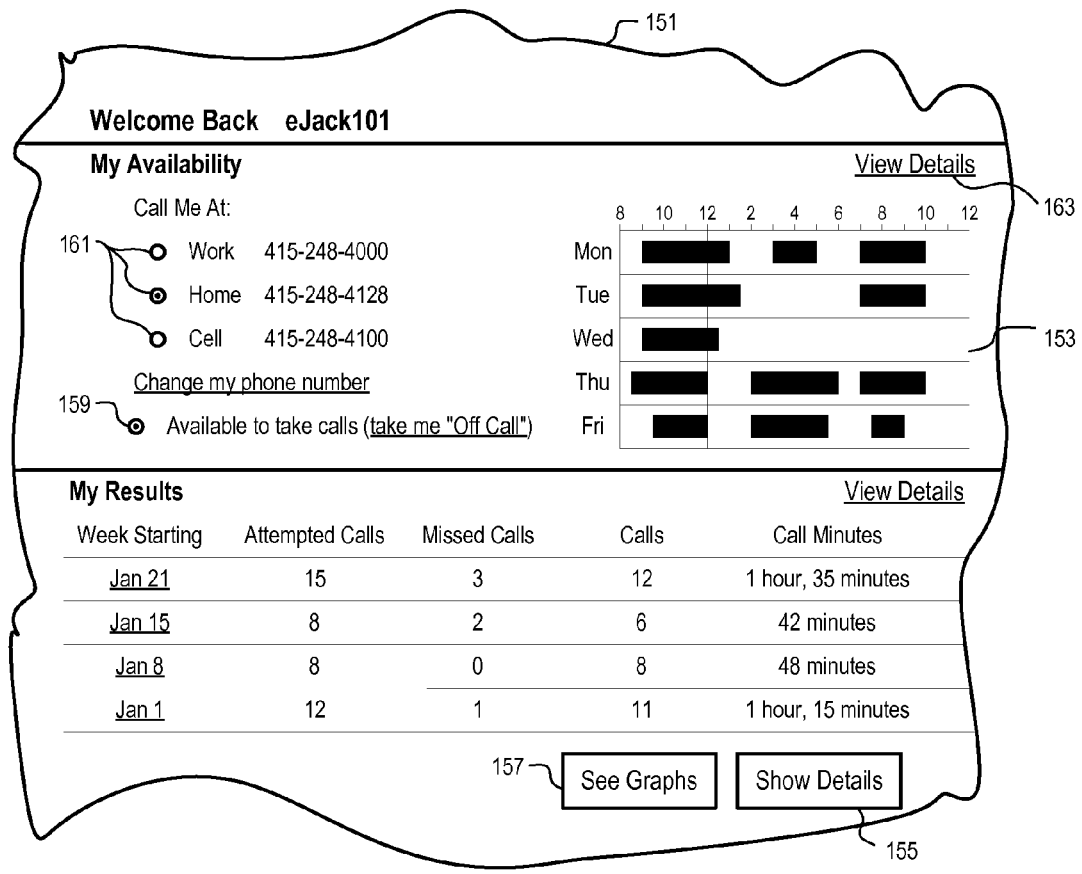
FIG. 3 illustrates an example of a user interface to manage availability for receiving phone calls according to one embodiment.

FIG. 3 illustrates an example of a user interface to manage availability for receiving phone calls according to one embodiment. An advertiser may specify the day and time of availability for accepting the calls for real time communications. Based on the availability, the system may schedule the presentation of the advertisements/communication references more effectively and block unwanted calls.

In one embodiment, the system can store multiple phone numbers of the seller. The system can intelligent route a call to the seller according to the preference of the seller. For example, in FIG. 3, the advertiser/seller may choose a preferred phone number from a set of phone numbers of the seller to receive incoming calls using the option group (161) in the user interface (151). The seller may indicate whether the seller is currently available to take calls or is to be taken "off call" (e.g., using the check box (159)).

In one embodiment, the system allows the seller to specify the schedule to receive calls; and the schedule (153) is displayed to the seller in a graphical way to help the seller to manage calls. In FIG. 3, the user interface (151) includes a link (163) which can be selected to display a user interface (not shown in FIG. 3) to manage the schedule (153).

In one embodiment, when the schedule or the check button (159) indicates that the advertiser/seller is currently not available to take calls for real time communications, the system can decrease the priority of the advertisement for this advertiser, or stop temporarily the presentation of advertisements for this advertiser. When there is a call intended for the advertiser at a time when the advertiser is not taking calls (e.g., according to the schedule), the system can block the call, or direct the call into a voice mail for the advertiser, or arrange a call at an alternative time, or obtain a callback number to allow the advertiser to initiate a callback to the customer.

In FIG. 3, the user interface (151) also includes a summary of call activities. Buttons (157 and 155) can be selected to show graphical representation of the call activities and further details of the call activities.

As the phone calls pass through the system, a wide array of information can be collected and tracked, including day/date/time of calls, duration of calls, call status (answered, no answer, busy), inbound phone numbers, etc. Such tracked information can be used in counting communication leads generated from advertisements. For example, when multiple calls are made from the same user to the same seller within a period of time (e.g., a day or a week), or in connection with the same offered or auctioned item, these multiple calls can be considered as one qualified call or a single lead.

In one embodiment, different types of communication references can be dynamically selected for advertisements to represent the contact information of the corresponding advertisers. A communication reference used to represent the contact of an advertiser may be a traditional phone number with or without an extension, a click-to-call reference, a SIP address for VoIP call, a click-to-reveal reference, etc. The communication reference can be embedded into an advertisement to count the communication leads generated from advertisements, to track the contributions of demand partners who operate media channels to present the advertisements to customers, and/or to track other aspects of advertising, such as partners who bring the advertisers/sellers to the system and the keywords responsible for the selection of the advertisement for presentation.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is willing to pay for the advertisement according to a price bid specified by the advertiser, a potential revenue for a particular party in the advertising activity, a classification or category of the advertisement (e.g., the category of service or product advertised in the advertisement), a geographical area served by the advertisement, the demand partner who is going to present the advertisement (e.g., the success rate of the demand partner in reaching viable customers in comparison with other demand partners), etc.

Figure 4:
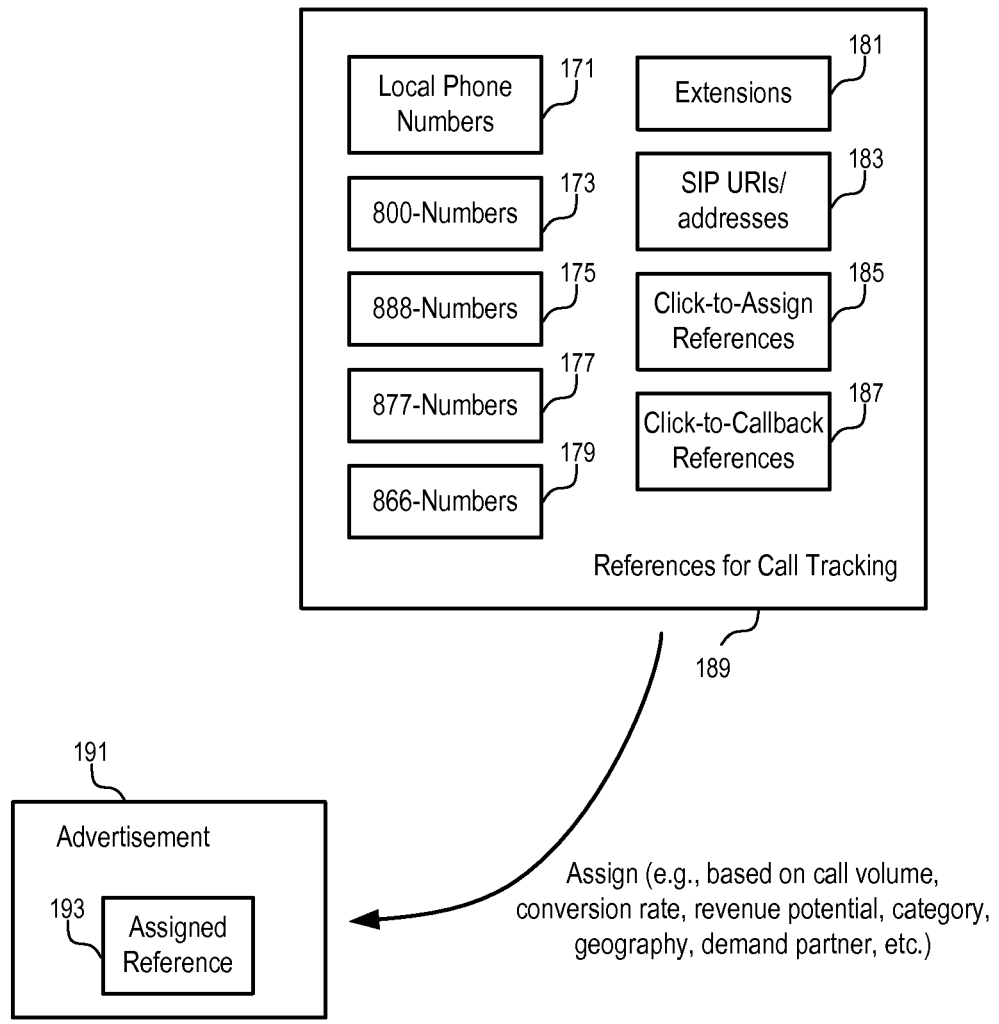
FIG. 4 shows a diagram illustrating a method to select a type of tracking mechanism with a corresponding reference for embedding in an advertisement according to one embodiment.

FIG. 4 shows a diagram illustrating a method to select a type of tracking mechanism with a corresponding reference for embedding in an advertisement according to one embodiment. In FIG. 4, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 4, a pool (189) of different types of references is maintained, such as local phone numbers (171), 800-numbers (173), 888-numbers (175), 877-numbers (177), and 866-numbers (179). Some of the references can be dynamically generated and used, such as extensions (181), SIP addresses (183), click-to-assign references (185) and click-to-callback references (187). In one embodiment, one or more of the references are selected and used as the assigned reference (193) that is embedded in the advertisement (191). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a media channel, a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner or to a web browser of a customer). For example, the tracking mechanism used in an advertisement that is to be presented via a particular demand partner can be upgraded or downgraded based on the statistical data collected from the past activities related to the advertisement.

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has a VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further interface (e.g., a web page, a dialog box, etc.) can be displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have a number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. For instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement being called is estimated based on the type of media channels used to present the advertisement, the demand partner responsible to deliver the advertisement, and/or the customer who views the advertisement. Any characteristics in advertising that have an impact on the likelihood of an advertisement being called and thus the expected revenue/profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 5:
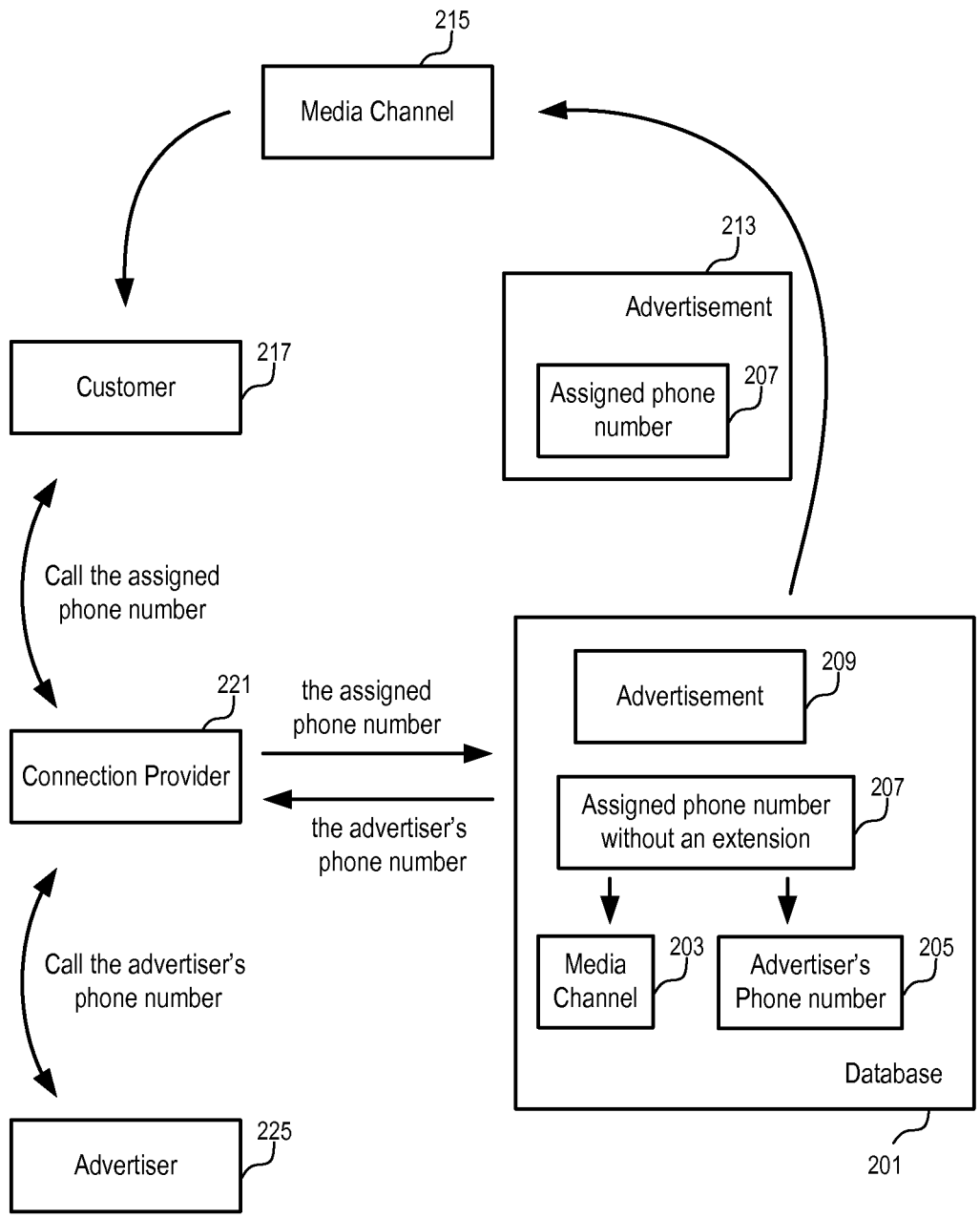
FIG. 5 illustrates an example of telephone call tracking mechanisms which can be selected according to one embodiment.

FIG. 5 illustrates an example of telephone call tracking mechanisms which can be selected according to one embodiment.

In FIG. 5, a phone number (207) without an extension is assigned for the generation a particular version (213) of an advertisement (209). In the database (201), the assigned phone number (207) is associated with the media channel (203) and the advertiser's phone number (205) (and/or other parameters to be tracked). Thus, the parameters to be tracked can be identified based at least partially on the assigned phone number (207). The particular version (213) of the advertisement (209) that has the assigned phone number (207) is provided to the customer (217) via the media channel (215). The advertisement may instruct or suggest the customer to call the assigned phone number (207) to reach the advertiser. In response to the advertisement, the customer may call the assigned phone number (207). When the connection provider (221) is called at the assigned phone number via a telephone carrier, the connection provider (221) can identify the assigned phone number (e.g., via a Dialed Number Identification Service (DNIS)) and determine the advertiser's phone number (205) based at least partially on the assigned phone number (207). Further, using the assigned phone number, it can also be determined that the phone call from the customer is a response to an advertisement that is delivered via the media channel (215) based on the association between the assigned phone number (207) and the media channel (203) in the database (201).

In one embodiment, after determining the advertiser's phone number from the assigned phone number that is dialed by the customer (217), the connection provider (221) makes a separate call to the advertiser (225) via a telephone carrier. When both the customer (217) and the advertiser (225) are on the line with the connection provider (221), the connection provider (221) can bridge or conference the calls to connect the customer (217) and the advertiser (225). Alternatively, the connection provider (221) may forward the calls from the customer (217) to the advertiser (225) after determining the advertiser's phone number.

In one embodiment, the assigned phone number can be a phone number that is local to the area to be served by the advertisement. Alternatively, the assigned phone number can be a toll free phone number, such as an 800- (888-, 877, or 866-) number. In one embodiment, the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800- number is easier to remember than other toll free numbers. Thus, there are different values in advertising in the different types of assigned phone numbers.

Since maintaining different phone numbers may increase the tracking cost, another type of tracking mechanism uses different extensions to differentiate tracked parameters. For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

In one embodiment, after the customer dials the root number, the customer is connected to an IVR system or a human operator of the connection provider/tracker. After the customer provides the extension to the IVR system or the human operator, the tracked parameters, such as the media channel and/or the advertiser's phone number, can be determined.

In one embodiment, the IVR system or the human operator can prompt the customer for the extension that is provided in the advertisement. When the dialed root number is sufficient to identify information about the media channel, the IVR system or the human operator may customize the prompt to include the information of the media channel and ask the customer to further provide the extension to reach the desired advertiser. When the dialed root number is sufficient to identify information about the advertiser, the IVR system or the human operator may customize the prompt to include the information of the advertiser and ask the customer to further provide the extension to reach the desired advertiser.

The extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database. Thus, different types of extensions can have different values in advertising.

The tracking methods described can have different costs. A toll-free number with many extensions, for instance, is much cheaper than many vanity toll-free numbers. Therefore, the system uses the more expensive methods when it's worthwhile to do so. For instance, if an advertisement receives many calls, it may be selected for a more expensive method of tracking. An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, the connection provider calls the customer instead of providing a phone number to receive a phone call from the customer. For example, the reference assigned to represent the contact of the advertiser may not be used to make a call via a traditional telephone carrier. The reference can be submitted to the connection provider via a data communication, such as an email, an SMS message, a web request, or other types of data communication. The reference can be used as a key in the database to look up the associated parameters, such as the media channel and the advertiser's phone number. In one embodiment, the reference is an encoded/encrypted version of the associated parameters, such that an authorized data system can decode/decrypt the information without having to look up from the database. After the reference is provided to the connection provider with the request for a connection, the connection provider can callback to the customer to establish the connection between the customer and the advertiser. The request may include a callback phone number of the customer. Alternatively, a customer may be prompted to provide the callback phone number in response to the request. The connection provider can connect the customer and the advertiser by calling the customer and the advertiser separately and bridge/conferences the calls, or by forwarding one call (e.g., the call to the customer) to another (e.g., to the advertiser).

In one embodiment, a telephone number assigned to a version of an advertisement includes a SIP address for the initiation of a VoIP-based telephone call. The SIP address can be used for a manually dialed call on a SIP-enabled phone, or be used in a click to call format. In one embodiment, the SIP address includes an encoded/encrypted version of the contact of the advertiser such that the connection provider can decode/decrypt the contact of the advertiser from the SIP address without having to look up from database.

In one embodiment, the allocation of a telephone number to an advertisement is deferred to a stage when a customer is interested in the advertisement and ready to make a phone call. A reference embedded in the advertisement can be used to specifically request for the telephone number that is assigned to the advertiser by the connection provider. The request can be sent as a web request in response to a click on a link, or as an email, an SMS message, or an instant message. The assigned telephone number may be a toll free phone number without extension, a local phone number with an extension, a SIP URL, etc. Alternatively, the reference can be used to request the actual phone number of the advertiser.

Figure 6:
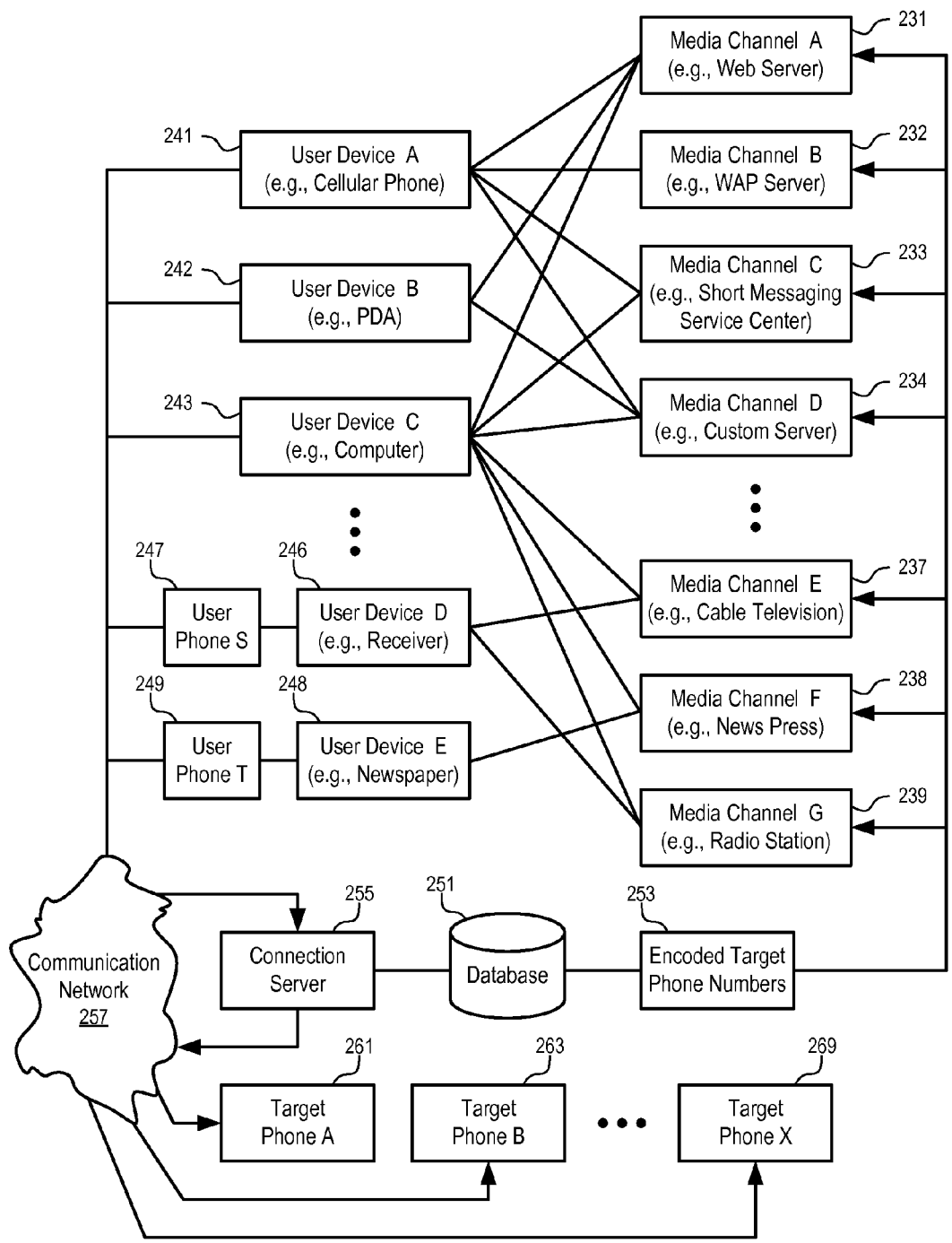
FIG. 6 shows a diagram of a system to make and track phone connections according to one embodiment.

FIG. 6 shows a diagram of a system to make and track phone connections according to one embodiment. In FIG. 6, a database (251) may contain the phone numbers of target phone A (261), target phone B (263), . . . , target phone X (269), etc. Typically, the target phones belong to the institutions, businesses, individuals, etc, which seek for publicity through various media channels, such as media channel A (231) (e.g., web server), media channel B (232) (e.g., WAP server), media channel C (233) (e.g., short messaging service center), media channel D (234) (e.g., custom server), media channel E (237) (e.g., cable television), media channel E (238) (e.g., news press), media channel G (239) (e.g., radio station), and others such as virtual reality, directory assistance service, interactive maps, etc.

In one embodiment, the phone numbers of the target phones are not directly publicized over the media channels. Instead, encoded target phone numbers (253) are used. Using the encoded target phone numbers (253), a user cannot reach target phones directly. The encoded target phone numbers (253) allow the association of additional information with the target phone numbers, such as the media channels used, special promotions, etc.

The encoded target phone numbers are delivered with content information (e.g., web page, WAP page, short message, television programs, news articles, virtual reality, etc.) to user devices, such as user device A (241) (e.g., cellular phone), user device B (242) (e.g., personal digital assistant (PDA)), user device C (243) (e.g., computer), user device D (246) (e.g., receiver), user device E (248) (e.g., newspaper).

In one embodiment, a user device can include a USB phone, a Bluetooth wireless phone, or one or more speakers or headphones with one or microphones for the implementation of a software based phone (softphone).

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. In one embodiment, the user devices/phones support the display of virtual reality.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (247) or user phone T (249).

In one embodiment, dialing at least a portion of an encoded target phone number connects the phone call to a connection server (255) first. According to the encoded target phone number dialed, the connection server (255) determines the corresponding target phone number using the database (251) and connects the phone call to the corresponding target phone (e.g., one of target phones 261-269) through the communication network (257).

Note the communication network (257) may be circuit switched, packet switched, or partially circuit switched and partially packet switched. For example, the telephone network may partially use the Internet to carry the phone call (e.g., through VoIP). For example, the connection between the user phone/device and the connection server (255) may be carried using VoIP; and the connection between the connection server (255) may be carried using a land-line based, circuit switched telephone network.

In one embodiment, the information associated with the encoded target phone number, such as the media channel used to provide the encoded target phone number to the users, is also decoded/retrieved using the database (251). Thus, the information associated with the encoded target phone number can be tracked/stored.

In one embodiment, the connection server (255) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the connection server (255). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the connection server (255) through the communication network (257); and a second portion of the encoded target phone number is to be decoded by the connection server (255). For example, the Dual Tone Multi-Frequency (DTMF) decoder can be installed in the connection server (255) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the connection server (255) for different target phone numbers; and the portion of the encoded target phone number that is used to reach the connection server (255) is not used in determining the information associated with the encoded target phone number.

Alternatively, multiple telephone numbers can be used to reach the connection server (255); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (251) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the connection server (255). When such a mapping scheme is used, a look up table is not necessary. For example, an encoded target phone number may include a first portion that is the phone number of the connection server (255), a second portion that is the target phone number appended with a number mapped from an identifier of the media channel. To prevent the user from dialing the target phone number directly, an encryption/scrambling scheme can be used to encode the second portion, which is decoded at the connection server (255).

In one embodiment, the connection server (255) determines the target phone number from the encoded target phone number dialed by the user and then dials the target phone number for the user and joins/bridges the phone calls so that the user can talk to the target phone.

In one embodiment, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of a keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the connection server (255), pauses for a short period of time for the connection server (255) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 6, the user device initiates the phone call. Alternatively, a connection server may be used to initiate phone calls both to the user device (or a separate user phone) and the target phone and then join/bridge the phone calls to connect the user to the target phone. For example, when the user selects the encoded target phone number, the selection of the target phone number is transmitted to the connection server with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the connection server. Alternatively, the content information can be formatted so that the selection is sent directly to the connection server.

When the connection server starts the phone calls, the encoded target phone number can also include alphabetic characters (and/or other characters). The connection server can decode the encoded target phone number to recover/retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the connection server connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the connection server.

For example, a toll-free number is published to advertise mortgage brokers in a particular geographic area. When a consumer dials the toll-free number, the call is routed to the highest bidding mortgage broker who is available in that market.

The connection server may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 7:
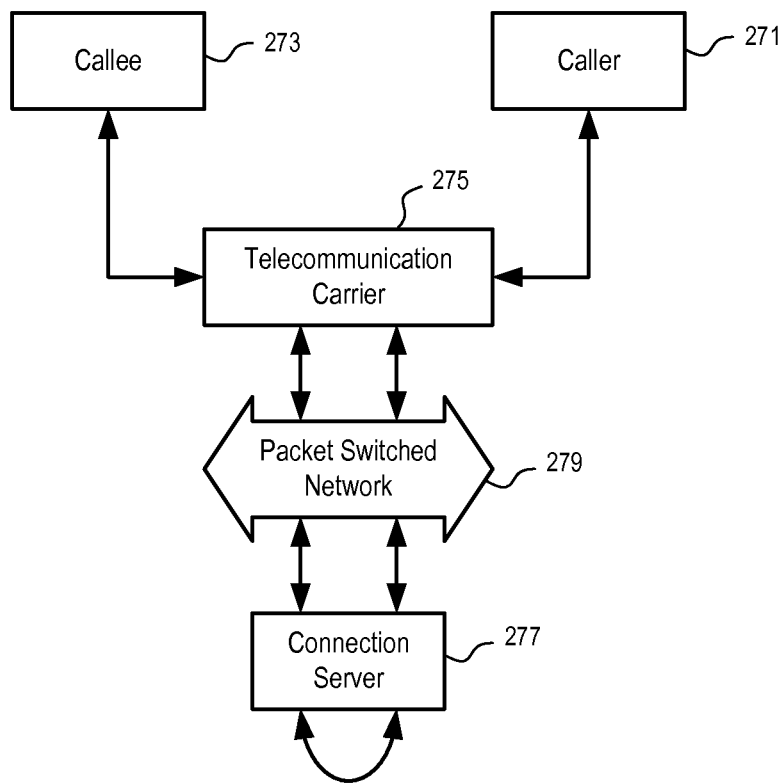
FIG. 7 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 7. In FIG. 7, the connection server (277) receives and/or places telephone calls via the telecommunication carrier (275) over the packet switched network (279). The telecommunication carrier (275) further routes the telephone communications towards the caller (271) and the callee (273).

Since the telecommunication carrier (275) can route a call from a packet switched network to a variety of destinations (e.g., a traditional analog telephone set, a mobile phone, a cellular phone, a WiFi phone, a Bluetooth phone, a softphone running on a computer, etc.), the connection sever (277) can use one type of communication connection with the telephone carrier (275) to facilitate the communication connections with variety of devices used by the customers (e.g., callers and callees). Thus, the implementation of the connection server (277) can be simplified. In one embodiment, the connection server (277) can also place and/or receive direct VoIP calls to/from the caller (or callee).

For example, to make a voice connection in response to a click-to-call request, the connection server can place separate VoIP calls, via the telecommunication carrier (275), to the caller (271) (e.g., the requester of the click-to-call) and the callee (273) (e.g., the destination of the click-to-call request).

If the caller (271) (or the callee 273) is on a public switched telephone network (PSTN), the telecommunication carrier (275) bridges the packet switched network and the public switched telephone network (PSTN). The telecommunication carrier (275) routes the call from the packet switched network (279) to the caller (271) (or the callee 273) on the circuit switched network. Thus, the caller (271) (or the callee 273) can use a telephone set to receive the call via a Plain Old Telephone Service (POTS). The connection server (277) joins the separate calls that are placed via the packet switched network (279) to connect the callee (273) and the caller (271).

In one embodiment, call signaling and media content may use different network paths. While call signaling is arranged to go through the packet switched network (279) and the connection server (277), the media stream does not have to go through the connection server (277). For example, when the calls are joined, the media content may be redirected to flow over the communication carrier (275) without going through the packet switched network (279) to the connection server (277) for improved performance and efficiency. The connection server (277) can release the control over the media stream to allow the media stream to flow through the shortest path, without going through the connection server, while maintaining control to the connection for the call by staying on the path for call signaling.

In another example, when the caller (271) initiates a call over a PSTN to the connection server (277), the telecommunication carrier (275) converts the call for the packet switched network (279) for the connection server (277).

In one embodiment, virtual softphones on the telecommunication carrier (275) are assigned to the caller (271) and the callee (273) for interfacing with the connection server (277) over the packet switched network (279). The virtual softphones encapsulates the devices and networks used by the caller (271) and callee (273) to access the connection server (277); and the telecommunication carrier (275) shields the connection server (277) from the implementation details of the user devices and networks used by the caller (271) and the callee (273). The connection server (277) calls (or receives calls from) and connects the virtual softphones on the telecommunication carrier (275) to connect the caller (271) and the callee (273).

In FIG. 7, the telephone connection between the telecommunication carrier (275) and the connection server (277) is facilitated via a packet switched network (279). Thus, the connection server (277) can operate efficiently in a digital domain. The connection server (277) interfaces with the telecommunication carrier (275) using one type of Internet Telephony systems (e.g., SIP-based Internet telephony).

Alternatively, a connection server may include some or all of the functionality of the telecommunication carrier (275). For example, the connection server may be configured to bridge a packet switched network and a circuit switched network. The connection server may support multiple, different types of Internet Telephony systems.

In one embodiment, the connection server (277) and the telecommunication carrier (275) are operated by different, separate entities. Alternatively, the connection server (277) and the telecommunication carrier (275) may be operated by the same entity. In another embodiment, the telecommunication carrier (275) includes a set of facilities operated by a number of separate entities.

In one embodiment, the caller (271) and/or the callee (273) may also place/receive calls via a packet switched network. The telecommunication carrier (275) may route the calls between the caller (271) and the callee (273) without using a PSTN. In one embodiment, caller (271) and/or the callee (273) may place calls to or receive calls from the connection server (277) via Internet.

Figure 8:
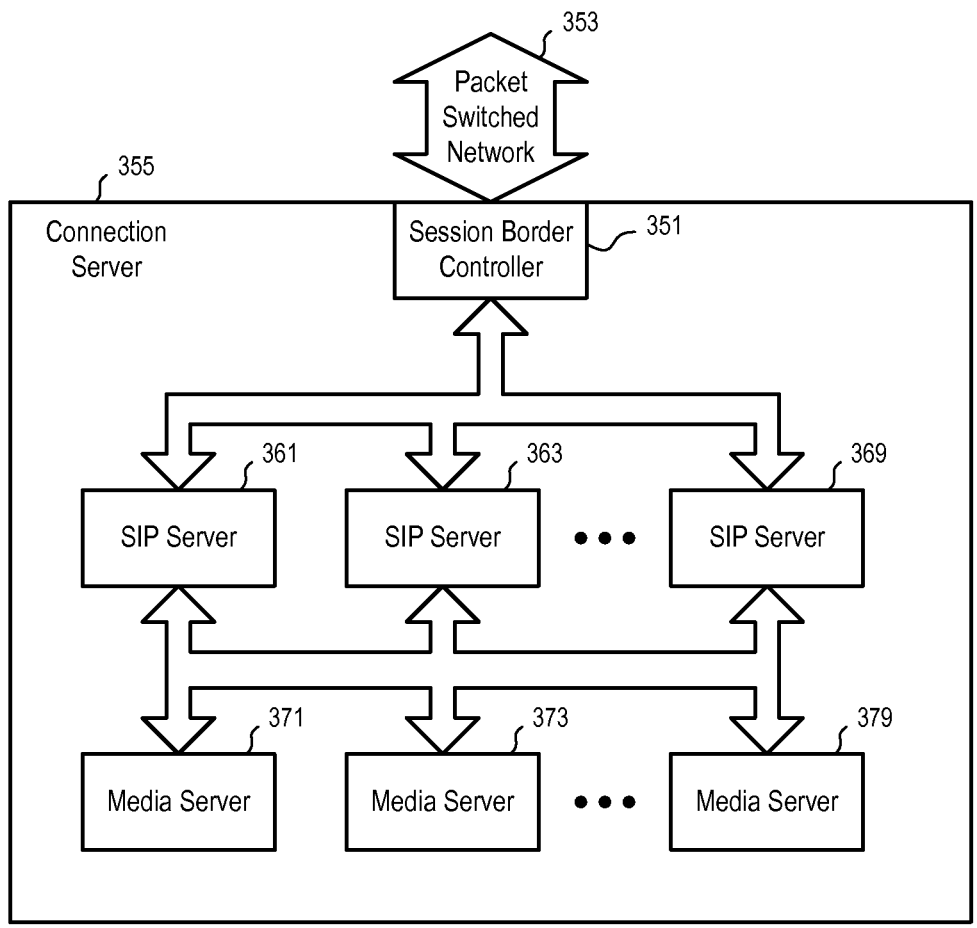
FIG. 8 shows a connection server according to one embodiment.

FIG. 8 shows a connection server according to one embodiment. In FIG. 8, the connection server (355) is configured to place and/or receive VoIP calls using Session Initiation Protocol (SIP). A session border controller (351) is used to interface with the packet switched network (353) and control the types of network traffic related to VoIP calls that might go into the connection server (355).

In one embodiment, the session border controller (351) is configured to control the signaling and media stream during the setting up, conducting and tearing down of VoIP calls to or from the connection server (355). In some embodiments, the session border controller (351) may pick up the call that comes to the session border controller (351), places a separate call from the session border controller (351), and joins the received call and the placed call to control both the signaling and media stream. In some embodiments, the session border controller (351) may perform signaling/encoding translation to allow the connection server (355) to process the VoIP calls in one standard, while receiving VoIP calls in a variety of standards (e.g., SIP, H.323, etc.). In one embodiment, the session border controller (351) is configured to perform one or more firewall functionalities, such as denial of service protection, call filtering, bandwidth management, etc.

In one embodiment, the session border controller (351) is configured to perform media releasing operation. When the session border controller (351) determines that the source and destination of a media stream is on the same side of the session border controller (351) (e.g., both the source and the destination of the media stream is outside the connection server 355), the session border controller (351) can release the hairpinning of the media stream and allow the media stream to flow without going through the session border controller (351).

In FIG. 8, a set of SIP servers (e.g., 361, 363, . . . , 369) are networked to the session border controller (351) to receive messages for incoming calls and to initiate outgoing calls. The session border controller (351) is configured to evenly distribute the calls for processing by the SIP servers.

For example, when an incoming message for the initiation of a call is received (e.g., a SIP INVITE message from the telecommunication carrier 275), the session border controller (351) may route it to a SIP server (e.g., 361) for processing. The INVITE message includes the phone number dialed by the caller and the contact information about the caller (e.g., the phone number of the caller 271 and/or the identity of the virtual SIP phone at the telecommunication carrier 275).

The SIP server may determine whether the phone number dialed by the caller (273) is sufficient to determine the phone number of the callee (e.g., 273). If the phone number of the callee (e.g., 273) can be determined from the phone number dialed by the caller (273) (e.g., via decoding the phone number dialed by the callee, or looking up the phone number of the callee from a table using the phone number dialed by the caller as a key), the SIP server can place a separate SIP call to the callee via the packet switched network (353) and then connect the caller and the callee. Alternatively, the SIP server can further route the SIP INVITE message (e.g., to the telecommunication carrier (275) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identify a media server (371) (or a virtual softphone on SIP server) as the initiator for a separate call. The SIP server then connects the calls for the media stream.

In one embodiment, the caller is first connected to a media server (e.g., 371, 373, or 379). For example, the SIP server may forward the SIP INVITE message to one or more of the media servers for answering the call. When a media server (e.g., 371) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (353) (e.g., by sending a SIP INVITE message to the telecommunication carrier 275, which further bridges the call to the callee 273). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (351) into the connection server (355). For example, the media stream can go through the telecommunication carrier (275) in FIG. 7 without going to the connection server (277) after the SIP server connects the caller and the callee.

However, the SIP server stays on the signaling path to monitor the progress and termination of the call. The SIP server can also break the connection between the caller and the callee, or force the media stream to come through the connection serve (355). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (353) for a connection to the caller. The SIP call may be bridged onto a circuit switched network (e.g., by a telecommunication carrier 275). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (361, 363, . . . , 369) and media servers (371, 373, . . . , 379) are implemented on separate computers connected via a local area network (and/or intranet or Internet). Alternatively, at least the some of the servers can be implemented on a same computer. In one embodiment, the SIP servers and the media servers are also integrated with the session border controller (351) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (355) may further include a database server (355) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

Figure 9:
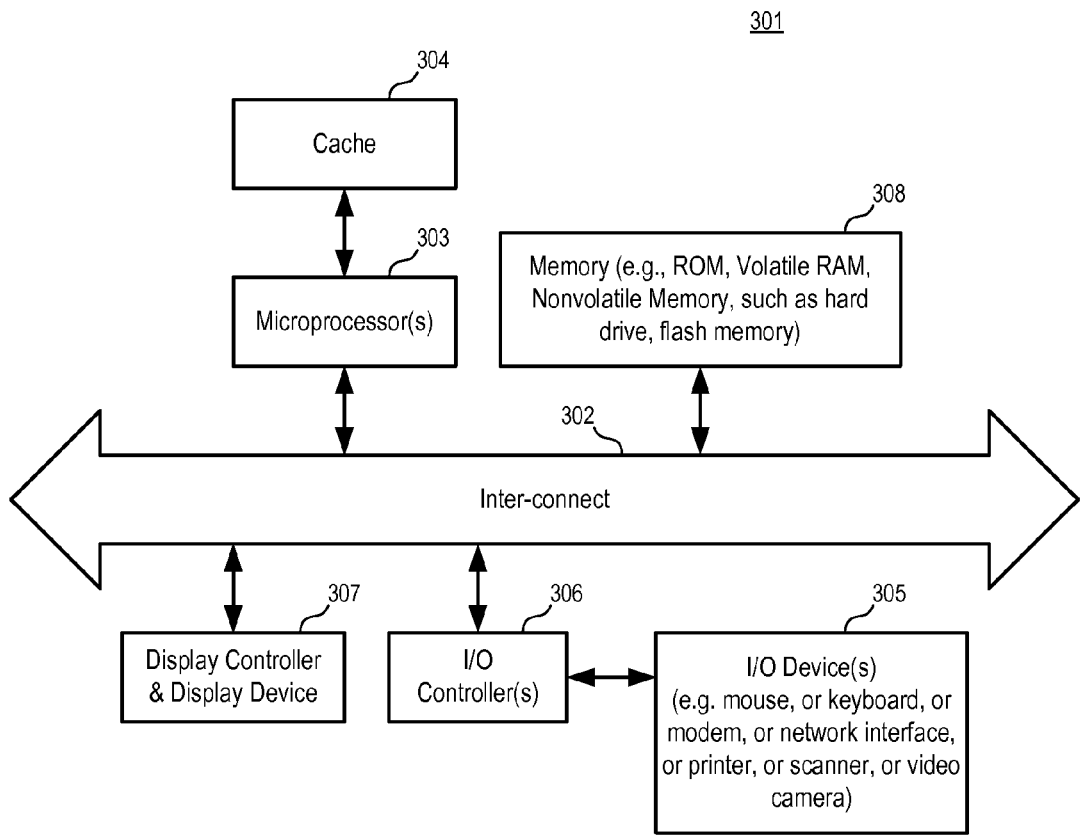
FIG. 9 shows a block diagram example of a data processing system which may be used in various embodiments.

FIG. 9 shows a block diagram example of a data processing system which may be used in various embodiments. While FIG. 9 illustrates various components of a computer system, it is not intended to represent any particular architecture or manner of interconnecting the components. Other systems that have fewer or more components may also be used.

In FIG. 9, the communication device (301) is a form of a data processing system. The system (301) includes an inter-connect (302) (e.g., bus and system core logic), which interconnects a microprocessor(s) (303) and memory (308). The microprocessor (303) is coupled to cache memory (304) in the example of FIG. 9.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 9 is used as one of the communication server(s), connection server(s), database server(s), media server(s), controller(s), router(s), gateway(s), etc.

A user terminal as a client system can be a data processing system similar to the system of FIG. 9. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

In one embodiment, a user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. Other types of traditional communication client(s) may be used in some embodiments.

In one embodiment, after a customer uses the reference provided in the advertisement (e.g., the phone number assigned to the advertiser) to initiate a communication session in response to the advertisement, prompts may be provided to the customer (e.g., to welcome the customer, to ask the customer to confirm the connection, to inform the customer about the status of the connection process, etc.). In one embodiment, the prompts are customized based at least partially upon the communication reference that is used to initiate the communication process, the performance of the advertisements, the traffic volume of the advertisements, the revenue potential of the advertisements, and/or other attributes of the advertisements.

For example, when a phone number dialed by the customer is associated with more than one advertiser/advertisement, a prompt to the customer can be used to ensure that the customer is connected to the right advertiser. For example, when a customer is calling from outside of an area of service of an advertiser, the customer may be prompted to ensure that the customer is calling the right advertiser. In one embodiment, the information about the advertiser/advertisement is selectively used to customize the prompt during the call received from a customer who is responding to the advertisement.

Figure 10:
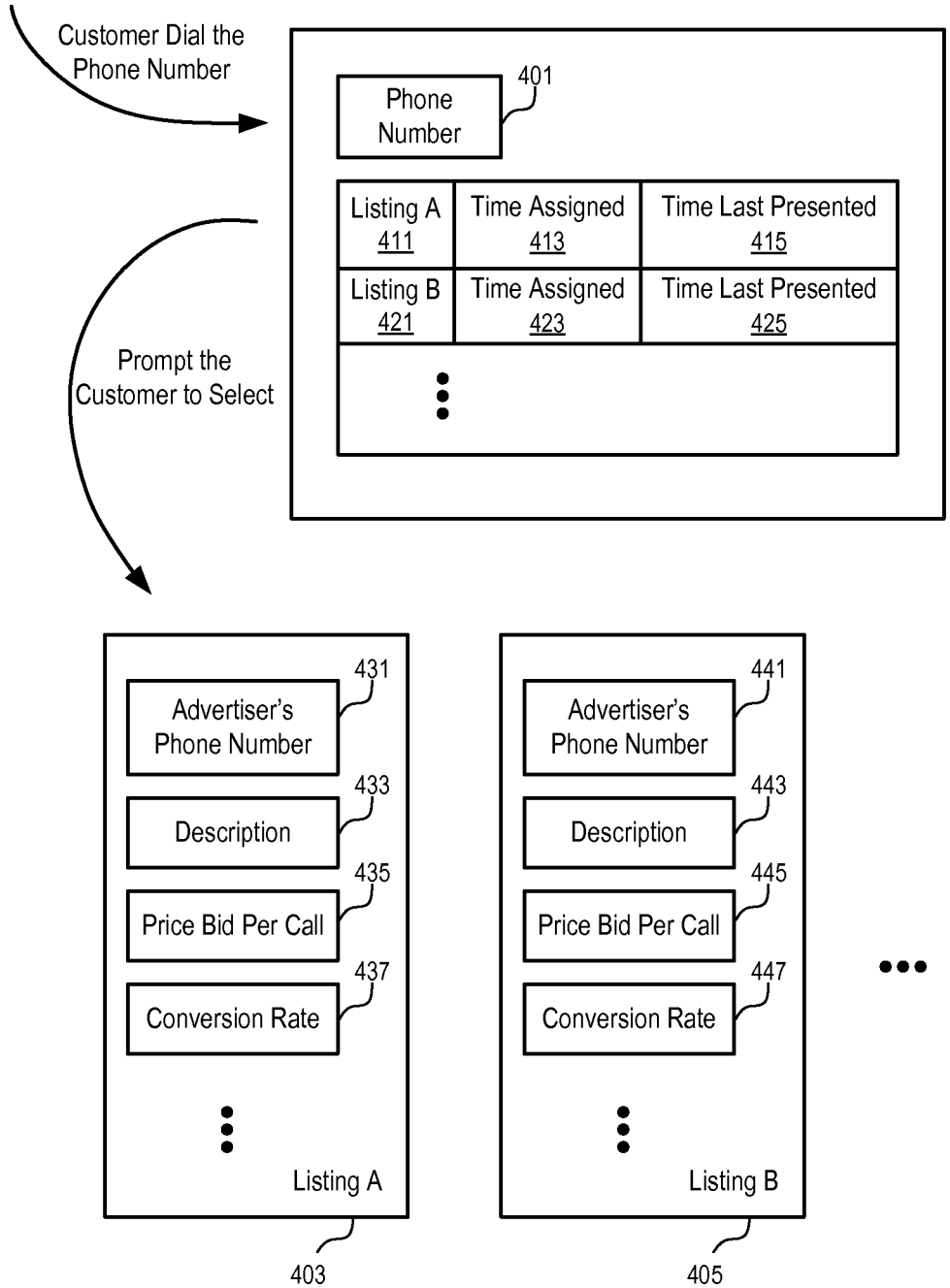
FIGS. 10-12 illustrate methods to prompt a customer responding to an advertisement according to one embodiment.
Figure 11:
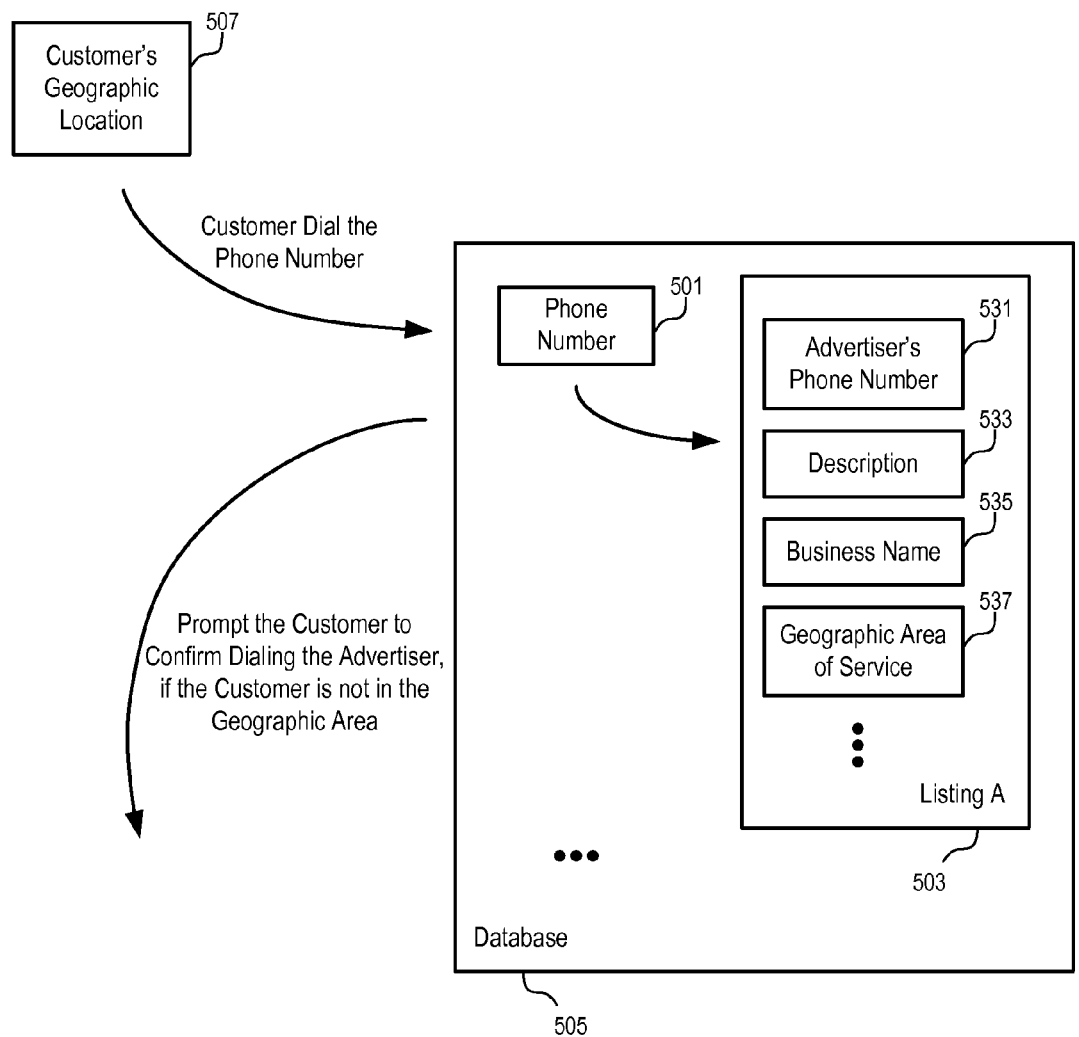
Figure 12:
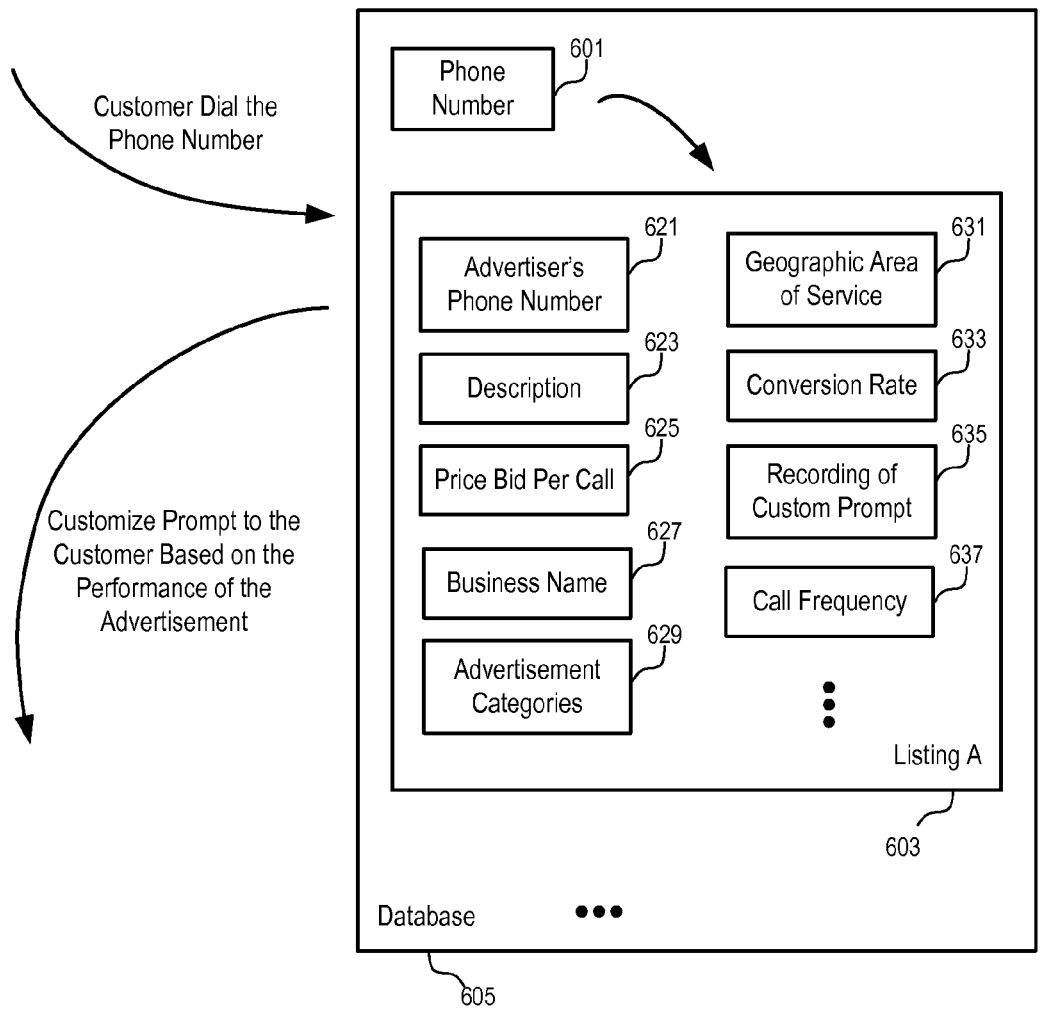

FIGS. 10-12 illustrate methods to prompt a customer responding to an advertisement according to one embodiment.

In FIG. 10, a phone number (401) can be associated with multiple advertisers/advertisement listings. The phone number (401) may or may not include an extension. Since the phone number (401) provided in an advertisement may not be sufficient to identify the advertisement/advertiser, a prompt can be dynamically generated and provided to the customer to resolve the ambiguity and to select the right advertisement/advertiser.

In one embodiment, the same communication reference, such as a phone number (401), can be assigned to multiple advertisers/advertisements. The system can track when the reference is assigned to a particular advertisement and/or when the reference is last presented in the corresponding advertisement.

For example, in FIG. 10, the phone number (401) is assigned to advertisement listing A (403) at time (413) and last presented at time (415); the phone number (401) is assigned to listing B (405) at time (423) and last presented at time (425). The identifiers (411 and 421) associate the date and/or time stamps (e.g., 413, 423, etc.) with the data of the corresponding advertisement listings (e.g., 403, 405, etc.).

In FIG. 10, the advertisement listing (403) has the advertiser's phone number (431), which is not presented to the customer. For a presentation to the customer, the advertiser's phone number (431) is replaced with the assigned phone number (401). The advertisement listing (403) has a description (433) (e.g., specified by the advertiser), a price bid per call (435) (e.g., specified by the advertiser), a conversion rate (437) (e.g., computed from statistical data to show a ratio between past presentations of the advertisement and customer phone calls resulted from the past presentations), etc. Similarly, the advertisement listing (405) has the corresponding advertiser's phone number (441), a description (443), a price bide per call (445), a conversion rate (447), etc.

In one embodiment, the date and time stamps (e.g., time assigned 413, time last presented 415, etc.) are used to determine whether the association relation between the listing and the assigned phone number has expired. Other types of data and time stamps, such as the time last called for a particular advertisement, can also be used.

In one embodiment, the time at which the phone number is assigned to an advertisement can be substantially different from the time at which the advertisement is presented. For example, an online demand partner may request the advertisement but fail to present the advertisement to a customer. For example, a phone number may be assigned to an advertisement for advertising on a printed media; and the time at which the advertisement, including the phone number, is presented to the customer may not be available.

In another embodiment, the time at which the phone number is assigned to an advertisement may be considered as the time at which the advertisement is presented. For example, the advertisement may be presented on an interactive media which allows the customer to particularly request the display of the phone number. The phone number is assigned in response to such a request from the customer. Thus, the time at which the phone number is assigned can be substantially the same as the time at which the phone number is presented.

In one embodiment, the system uses a time period threshold to determine the expiration of the association relation and thus allow the reuse of the phone numbers without ambiguity, or with a reduced degree of ambiguity. For example, after the time period that is longer than the threshold elapses since the assignment of the phone number to the advertisement (or since the last presentation of the advertisement, or since the last received call to the advertisement via the phone number), the phone number may be considered as being no longer associated with the advertisement. Thus, records that are older than the time period threshold may be discarded or ignored during the process of identifying the advertisement/advertiser that is being called by the customer.

In one embodiment, different time period thresholds can be used to determine the expiration of the association relation between the phone number and the corresponding advertisements. The thresholds may be based on how the phone number is assigned, the type of the media channel that is used to present the advertisements, the advertisement categories of the advertisements, the performance of the advertisements, etc. For example, an assignment that is in response to the request from a customer via an interactively displayed advertisement can be set to expire in one time period; and an assignment for an offline presentation of an advertisement may be set to expire in another time period.

In one embodiment, the expiration times of the association relations are tracked directly. For example, events related to the advertisement, such as the assignment of the phone number to the advertisement, a presentation of the advertisement, and a received phone call generated from the advertisement, can be used to establish and/or update the expiration time of the association relation. For example, after the presentation of an advertisement via a web interface, the association relation may be set to expire within a period of time. The time period may be determined based on a statistical data related to the time gap between the presentation and a subsequent response to the advertisement. If within the time period, a phone call is received as a response to the advertisement, the expiration time of the association relation can be revised, in view of the phone call.

In one embodiment, a phone number is re-assigned after the previous assignments are expired. Alternatively, a phone number may be reassigned before the expiration of the previous assignments (e.g., when no other phone numbers available for assignment). For example, a phone number that is assigned to an advertisement that is less frequently called or less likely being called may also be assigned to another advertisement.

In one embodiment, when the phone number is assigned to a new advertisement and the phone number is still currently associated with an old advertisement, an extension number (or an additional extension number, or additional digits in the extension) can be provided to differentiate the advertisements. Thus, whether the customer dials the additional digits can be used to select a specific advertisement. Further, if the association relation between the old advertisement and phone number expires before a call from a customer is received, the customer does not have to dial the extension.

In another embodiment, the same phone number is assigned to the new advertisement without assigning additional digits. At the time a phone call is received at the phone number, the customer is prompted to select an advertisement.

For example, at the time a phone call to the phone number (401) is received, the data records may show that both advertisements (403 and 405) are currently associated with the phone number. Thus, the customer is asked to select one. The prompt may include presenting an aspect of the advertisement (403) to allow the customer to confirm whether the call is intended for the advertisement (403).

For example, a business name of the advertisement (403) can be presented in the prompt provided to the customer (e.g., via a text-to-speech synthesizer, or a recording of an announcer); and the customer can press a key (e.g., "#", or "*", or "1"), or provide a voice command (e.g., "connect"), to confirm that the customer is calling the advertisement (403). If the advertisement (403) is not selected, the business name of the advertisement (405) is presented in the prompt. Thus, the advertisements (e.g., 403 and 405) are sequentially presented for selection by the customer. Other aspects of the advertisements, such as the category of the advertisements, the geographic area of the advertisements, brief description of the advertisements, etc., can also be used in the prompt to formulate the selection options.

In one embodiment, the order in which the advertisements (403 and 405) are presented in the prompt for selection is determined based on the timing of association relations between the phone number and the corresponding advertisements. For example, the advertisement that is presented latest can be prompted first. For example, in the prompt, the advertisements can be presented according to the reverse order of assignments of the phone number to the corresponding advertisement.

In one embodiment, the order in which the advertisements (403 and 405) are presented in the prompt is determined based at least in part on the performance of the advertisements. For example, the advertisements (403 and 405) can be presented sequentially in the prompt based on a conversion rate of the advertisements. The conversion rate indicates the ratio between a count of presentations of an advertisement and the customer phone calls resulted from the presentation. The higher the conversion rate, the more likely the advertisement is to get customer response. Thus, the advertisement with a higher conversion rate is prompted before the advertisement with a lower conversion rate.

In one embodiment, the likelihood of the call being generated from the advertisements is estimated based on the statistical data of the past responses received for the advertisements. The advertisements (e.g., 403 and 405) are prompted in an order according to the likelihood of the call being generated from the advertisements.

In one embodiment, the advertisements are prompted in an order according to the advertisement revenue potential of the advertisements. For example, the advertisements can be prompted in the order of the price bid per call (e.g., 435 and 445) of the advertisements. The advertisement that offers the highest price bid per call is presented first. For example, assuming that the call is for a specific advertisement, the advertisement revenue that would be generated for a specific party (e.g., after deducting the portion that is earned by an advertising partner, such as a demand partner) can be computed; and the advertisements are sorted according to the computed advertisement revenue for the specific party.

In one embodiment, taking into account of the likelihood of the call being for a specific advertisement, the expectation of the advertisement revenue generated from connecting the call to the advertiser of the specific advertisement can be estimated; and the advertisements are sorted according to the expectation of the advertisement revenue for presentation in the prompt.

In one embodiment, the likelihood of a customer being not patient enough to wait through the prompt is considered and estimated. The sequence in which the advertisements are presented in the prompt is then selected to maximize/improve the expectation of the advertisement revenue generated from the received call.

In one embodiment, the system determines whether there is an indication that a customer's phone call is intended for a different advertisement. In one example, when the phone number dialed by the customer is assigned to multiple advertisements, a prompt is presented to allow the customer to select the desired advertisement. In another example, when the system determines that the customer is calling from a geographic location that is outside a geographic area of service of an advertisement that is associated with the phone number, the system may provide a prompt to ask the customer to confirm the call to the advertiser, as illustrated in FIG. 11.

In FIG. 11, the customer's geographic location (507) is determined. For example, the customer's geographic location can be determined or estimated based on the phone number from which the customer's phone call is initiated. Alternatively, for example, when the customer calls from a mobile phone, the mobile phone may determine the current location and provide the location information. Alternatively, for example, the base stations of a cellular communication network can determine the location of a cellular phone. Alternatively, the customer can provide the geographic location via the communication connection between the customer and the system (e.g., via providing a zip code).

In FIG. 11, the phone number (501) dialed by the customer is uniquely associated with advertisement (503) in the database (505). When the geographical location of the customer (507) is within the geographic area of service (537), there is no indication that the customer has dialed a wrong number; and thus, the customer can be connected to the advertiser's phone number (531) without a prompt. When the geographical location of the customer (507) is outside the geographic area of service (537), there appears a possibility that the customer may have dialed a wrong number; and thus, the customer is prompted to confirm whether the call is for the advertiser.

For example, the prompt may present the business name (535) to the customer via the phone connection to ask the customer whether the customer intends to reach the specified business. The prompt may further include the description (533) and/or other aspects of the advertisement, such as the categories of the advertisement. The customer is connected to the advertiser's phone number (531) if the customer confirms the intention; otherwise, the customer can be connected to an operator or an interactive voice response (IVR) system for the identification of the advertiser.

In one embodiment, when a phone number dialed by the customer corresponds to multiple advertisements, one or more advertisements can be eliminated by comparing the geographical location of the customer and the geographic area of services of the advertisements. For example, an advertisement having a geographic area that does not cover the geographic location of the customer is eliminated. In another embodiment, the sequence of prompting the customer for the advertisements is based on whether the geographic location of the customer is inside the geographic area of service of the corresponding advertisements.

In FIG. 12, a customer dials the phone number (601) that is associated with the advertisement listing (603) in the database (605). Before the customer is connected to the advertiser's phone number (621), the customer may be provided with a prompt for enhanced experience, based on the performance of the advertisement (e.g., conversion rate (633), call frequency (637)) and/or the price bid per call (625).

For example, when the performance of the advertisement, such as conversion rate (633), is above a threshold, a customized prompt can be provided to the customer for enhanced experience. The customized prompt may greet the customer with the business name (627), inform the customer the current status of connecting to the advertiser, provide the description (623) while the customer is waiting to be connected to the advertiser, etc. The customized prompt may optionally include the information about advertisement categories (629), geographic area of service (631), etc.

In one embodiment, whether to play a recording (635) of a custom prompt to the customer is based on the performance of the advertisement and/or the price bid of the advertisement. The custom prompt can be the recording of a human announcer, or the recording provided by the advertiser.

In one embodiment, the performance of the advertisement may be measured based on the number of phone calls generated in a time period. An advertisement having a number of calls larger than a threshold can be provided with a customized prompt to enhance customer experience.

In one embodiment, whether to customize the prompt is at least partially based upon the price bid per call (627). For example, when the price bid per call (627) of the advertisement (603) is above a threshold value, the customer of the advertisement is provided with a customized prompt. The customization of the prompt can also be based upon the revenue potential for a specific party (e.g., the connection provider/tracker). In one embodiment, multiple levels of customization are provided based on the statistical data of customer calls that are in response to the advertisement and/or the price bid per call (625).

In one embodiment, the communication references used to facilitate the tracking of communication leads generated from advertisements are organized in a hierarchical structure, such that a portion of a communication reference can be used to identify at least one attribute of a set of advertisements.

For example, a root phone number can be used to represent a common attribute of a set of advertisements; and extensions to the root phone number can be used to uniquely identify the individual advertisements. When a phone call is received at the root phone number, the common attributes associated with the root phone number can be used to customize the prompt; and the customer is further prompted to dial the extensions.

Figure 13:
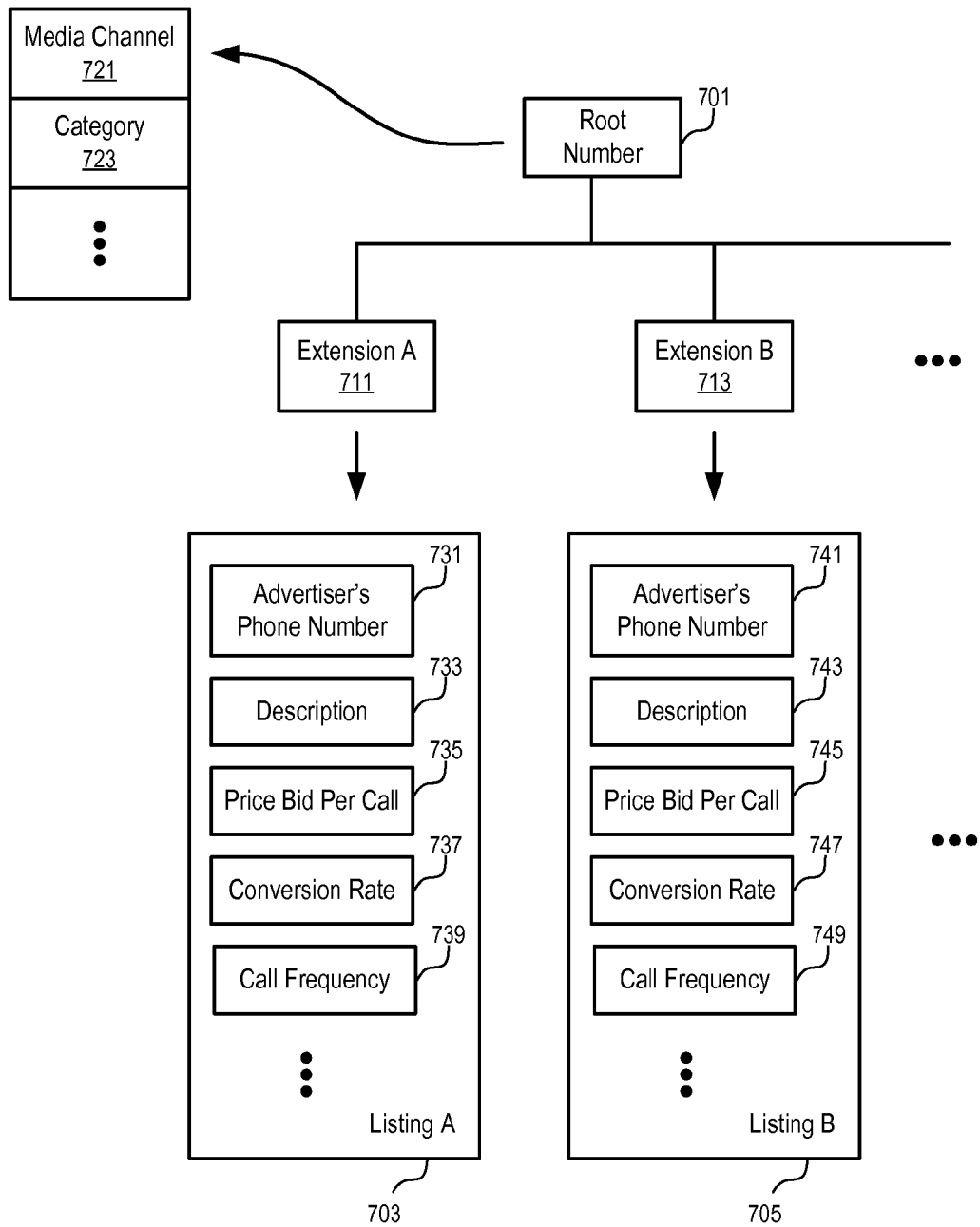
FIG. 13 shows a structure for the customization of a prompt to a customer responding to an advertisement according to one embodiment.

FIG. 13 shows a structure for the customization of a prompt to a customer responding to an advertisement according to one embodiment. In FIG. 13, a root number (701) has a number of extensions (e.g., 711, 713, etc.). A combination of the root number and an extension can be used to uniquely identify an advertisement (e.g., 703 or 705). The root number (701) can be associated with advertisement attributes that are common to the advertisements associated with the same root number (701). Examples of such attributes include the identification of a media channel (721) that is responsible for delivering the advertisements to customers, a common category (723) of the advertisements.

When the customer's phone call is connected to the root number (701), a prompt announcing the name of the media channel (721) is provided to the customer. The prompt may further include the advertisement category (723) and ask the customer to further enter the extension. After the extension is received, one of the advertisements is identified based on the received extension; and the description (e.g., 733 or 743) can be further used to customize the prompt while connecting the customer to the advertiser's phone number (e.g., 731 and 741).

FIG. 13 illustrates a one-level extension system, in which the extensions point to the corresponding advertisements. Alternatively, multiple levels of extensions can be used, in which an intermediate level extension is associated with multiple advertisements; and common attributes can be associated with the intermediate level extension, in a way similar to the association between common attributes and the root number (701).

Optionally, if the customer does not wish to enter the extension manually, the customer can be provided with the option to select one advertisement without having to enter the extension directly. Aspects of the advertisements (e.g., 703, 705) that are associated with the root phone number (or an intermediate level extension) can be presented sequentially (e.g., in an order according to the conversion rate (e.g., 737, 747, etc.), frequency of phone calls received for the advertisements (e.g., 739, 749, etc.), price bid per call (e.g., 735, 745, etc.), revenue potential, etc.); and the customer can press a key (e.g., "#", "*", "0", etc.) or speak a voice command (e.g., "connect") to select an advertisement (e.g., during or shortly after the presentation for the advertisement).

In one embodiment, when it is determined that a root number, or an intermediate extension number is sufficient to identify an advertisement (e.g., after other advertisements are no longer associated with the root number, or have been eliminated based on the geographic location of the customer), the system can customized the subsequent portion of the prompt to ask the user to confirm dialing the advertiser of the advertisement, instead of prompting the user to further dial the extension.

In one embodiment, prompts to callers are designed to decrease the connection of misdialed and/or misdirected calls through the connection provider to the advertisers. Testing results of prompts played according to embodiments of the disclosure showed that playing a prompt to the caller decreased the number of misdirected calls connected while maintaining, if not increasing, the overall call quality (e.g., call length).

For example, looking to get his car fixed, Greg searches the Internet for "San Francisco Ford Car Repair" (e.g., searching via a demand partner of the connection provider). An advertisement containing a 1-800 number of the system is retrieved and presented to Greg. Greg dials the 1-800 number of the system and hears a prompt saying, "Please hold while we connect you to Scott's Auto-Body Shop." Since Greg intended to call the auto-body shop, he remains on the line while the system connects the call through to the advertiser, Scott's Auto-Body Shop.

In another example, trying to dial a 1-800 number, John accidentally misdials to call an active number of an advertisement, such as the 1-800 number of the system assigned to the advertisement of Scott's Auto-Body Shop. Hearing a prompt saying "Please hold while we connect you to Scott's Auto-Body Shop.", John realizes that he has dialed the wrong number and hangs up the phone before it starts to ring on the advertiser side. As a result, the advertiser, Scott's Auto-Body Shop, does not receive a dirty lead and is more satisfied by the quality leads delivered by the system.

In one embodiment, the prompts to callers are designed in a way to improve the caller experience and the quality of leads delivered.

Figure 14:
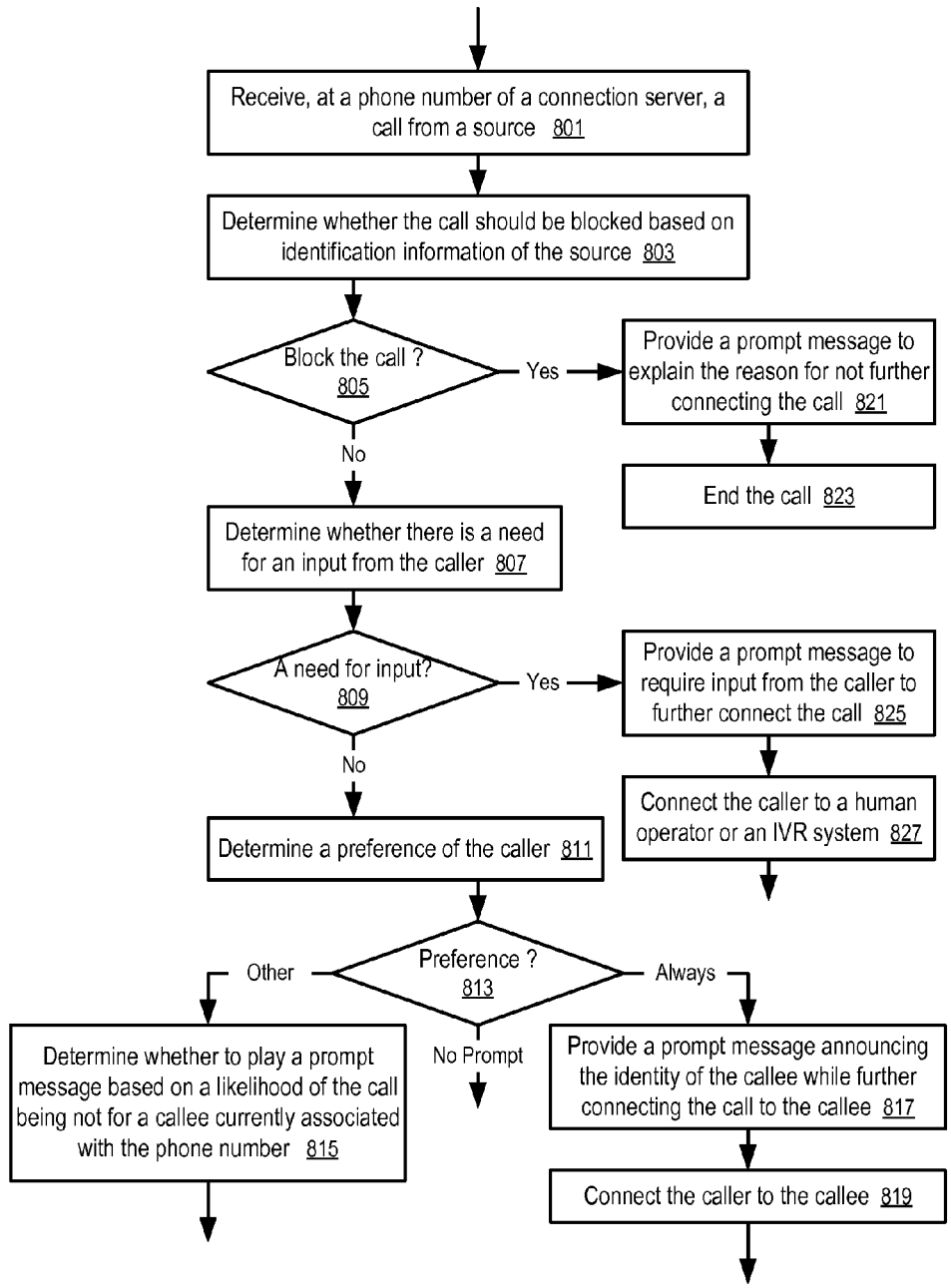
FIG. 14 shows a method to provide prompt according to one embodiment.

FIG. 14 shows a method to provide prompt according to one embodiment. In FIG. 14, different types of prompts are played under various different situations, which are examined, detected or determined by the connections server.

In FIG. 14, after a call is received (801) at a phone number of a connection server from a source, it is determined (803) whether the call should be blocked based on identification information of the source. If (805) the call is to be blocked, a prompt message is provided (821) to explain the reason for not further connecting the call; and the call is ended (823).

For example, if the system determines that the caller's phone number as determined via an automatic number identification (ANI) service is not valid, a prompt message such as "We're sorry, our system has detected that you are calling from a telephone number that is not valid. If you feel that you have reached this message in error, please contact us at 1-800-549-1744." is played to the caller, explaining that the call will not be connected and offering no mechanism to connect.

In one embodiment, the calls from phone numbers associated with known spammers or from callers who have been complained about by the advertisers are blocked.

In FIG. 14, if (805) the call is not to be blocked, it is determined (807) whether there is a need for an input from the caller. If (809) there is a need for an input from the caller, a prompt message is provided (825) to the caller to require input from the caller to further connect the call to the advertiser; and the caller is connected (827) to a human operator or an IVR system to obtain the required input.

For example, if the connection server have received more than a threshold number of calls from the phone number of the current caller within a predetermined time period, a prompt message such as "To connect to Scott's Auto-Body Shop, please press 1. If this is not the business you are trying to reach, please press 9." is played to the caller, asking the caller to take an action in order to be connected through to the advertiser associated with the phone number dialed by the caller. Thus, if there is no human behind the call to provide the correct input, the call can be blocked.

In one embodiment, the connection server checks if the call is received from an auto-dialer. For example, based on call statistics, such as the speed of dialing a call, the pattern of phone numbers called (e.g., calling numbers in a sequential pattern), etc., the connection server may identify certain calling phone numbers as potential auto-dialers. The connection server can maintain a list of calling phone numbers that are potential auto-dialers and check the current calling phone number against the list.

Further, in one embodiment, the connection server can estimate the probability/likelihood of the calling phone numbers being auto-dialers based on the collected data about past calls. When the connection server determines that the current call is likely from an auto-dialer, a prompt message can be played to ask the caller to take an action.

In one embodiment, a prompt message can be played to require an input from the caller to confirm the call, to confirm the call to the advertiser currently associated with the phone number dialed by the caller, to confirm an identity of the caller, to collect payment information, etc.

In FIG. 14, if (809) there is no need for an input from the caller, a preference of the caller is determined (811). The caller may have previously indicated to the system a preference (813) about the prompt. The caller may indicate the preference via registering with the system and associate a preference option with a phone number of the caller. Alternatively, the caller may indicate a preference in a prior phone call to the connection server.

In FIG. 14, when the preference (813) of the caller is to always play a prompt message, a prompt message is provided (817) to announce the identity of the callee while the connection server is connecting the call to the callee. The connection server can connect the caller (819) to the callee without further input from the callee.

For example, a no-action-required prompt such as "Please hold while we connect you to Scott's Auto-Body Shop" can be played to identify the callee, asking the caller to stay on the line in order to be connected through to the advertiser who is currently associated with the phone number dialed by the caller.

When the preference (813) of the caller is "no prompt," the connection server can connect the caller to the advertiser associated with the phone number dialed by the caller without providing the prompt message.

Alternatively, the caller may set the preference (813) to let the system decide whether to play a prompt message. The connection server then determines (815) whether to play a prompt message based on a likelihood of the call being not for a callee currently associated with the phone number, as illustrated in FIG. 15.

Figure 15:
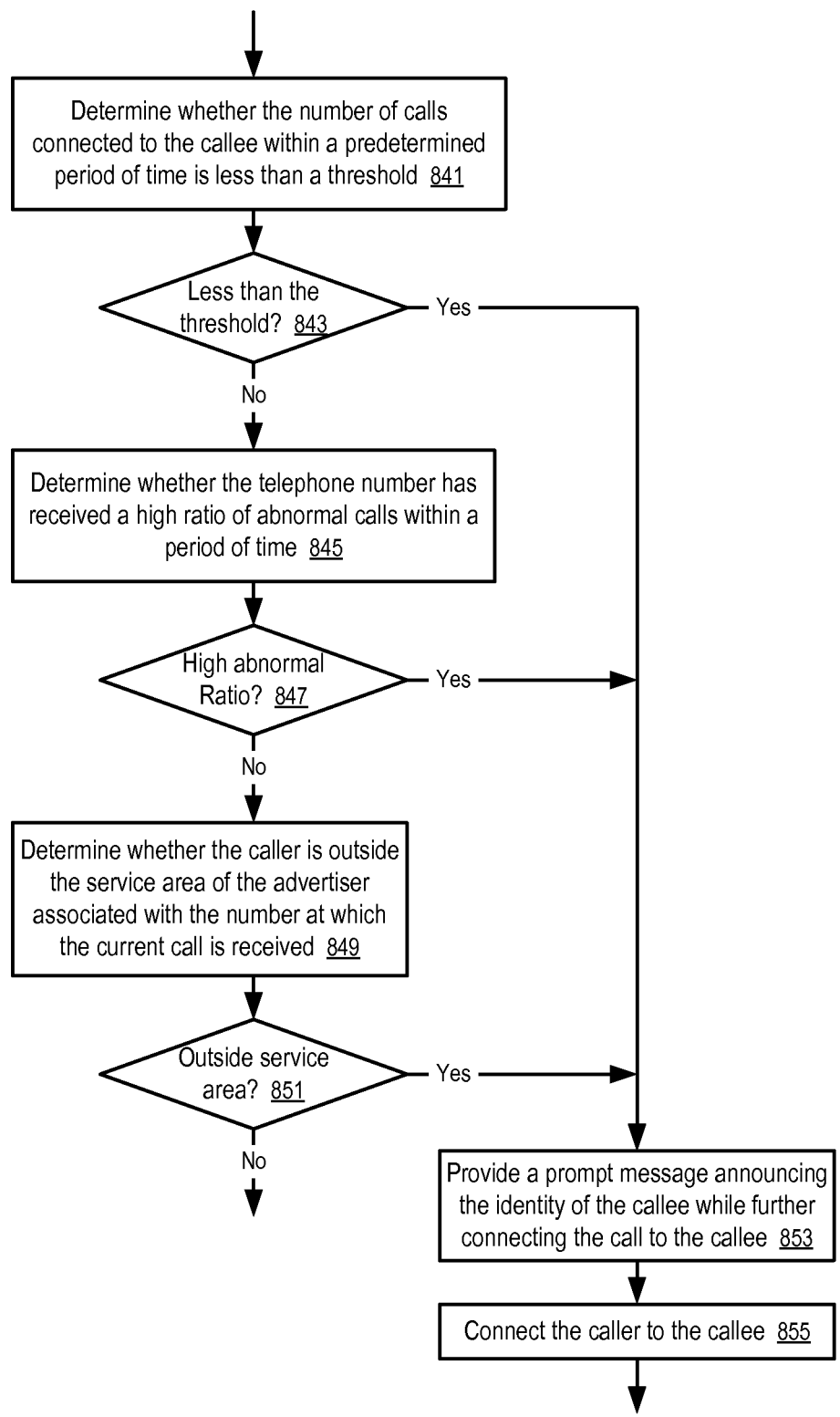
FIG. 15 shows a method to determine whether to play a prompt identifying the callee based on various indicators of the likelihood of a call being not for the callee who is currently associated with the phone number being called according to one embodiment.

FIG. 15 shows a method to determine whether to play a prompt identifying the callee based on various indicators of the likelihood of a call being not for the callee who is currently associated with the phone number being called according to one embodiment.

In FIG. 15, the connection server determines (841) whether the number of calls connected to the callee (the advertiser currently associated with the phone number dialed by the caller) is less than a threshold within a predetermined period of time. If (843) the number of calls connected to the callee is less than the threshold, a prompt message announcing the identity of the callee is provided (853), not requiring the user to take an action; and the caller is connected (855) to the callee without further input from the caller.

In FIG. 15, the connection server determines (845) whether the telephone number dialed by the caller has received a high ratio of abnormal calls within a period of time. If (847) a high abnormal ratio is detected, a prompt message announcing the identity of the callee is provided (853); and the caller is connected (855) to the callee.

For example, the connection server can compute real-time ratios for different time periods of calls to the phone number dialed by the caller and comparing the ratios to the historical average computed over a predetermined period of time (e.g., the last 30 days). For example, the connection server can calculate the ratio of short calls in calls received at the phone number in the last 5 minutes, last 30 minutes, last 6 hours, last 12 hours, and last 24 hours, etc. . . . . If any of these ratios are greater than the historical average over the last 30 days multiplied by a factor, the connection server may consider this phone number dialed by the caller "dirty", since there is a high probability that the caller dials the phone number with an intention to reach a party other than the advertiser currently associated with the phone number. Thus, a caller prompt that does not require the user to take action can be provided to reduce or avoid the chance of delivering a dirty lead to the advertiser. After the ratios of abnormal calls fall back to the normal range, the caller prompt may not be needed.

One example of a dirty phone number is a misprinted number in a newspaper advertisement. Another example of a dirty phone number is a phone number that was previously allocated to a different advertiser. The connection server can perform the dirty phone number check based on the ratio of abnormal calls and/or other indicators. For example, when the time duration between the presentation/allocation of a phone number for a previous advertiser and the presentation/allocation of the same phone number for the current advertiser, the phone number can be considered dirty and need a prompt. In one embodiment, the prompt may allow the user to select from being connected to the current advertiser and being connected to the previous advertiser. A user input may be optional, if the user wants to be connected to the advertiser who is currently associated with the phone number.

In FIG. 15, the connection server determines (849) whether the caller is outside the service area of the advertiser associated with the number at which the current call is received. If (851) the caller is current outside the service area of the advertiser, a prompt message announcing the identity of the callee is provided (853); and the caller is connected (855) to the callee.

For example, if the caller is calling from a landline or a cell phone that is determined to be currently outside the advertisement's service area, a prompt is played to identify the advertiser and/or the service area of the advertiser, without requiring the user to take an action while the connection server makes the connection.

In one embodiment, the determinations made by the connection server, as illustrated in FIG. 15, can be performed in various different sequences and combinations. More or less of the determinations of the likelihood of a call being not for the advertiser who is currently associated with the phone number being called can be implemented. Further, at least some of the situations may be selected to require a user input to confirm the connection to the callee.

In one embodiment, local telephone numbers of a connection server are assigned dynamically to advertisements just in time when the advertisements are requested for presentation. The use of local telephone number in advertisements for connecting callers to the respective advertisers of the advertisements can increase call through rates. For example, local telephone numbers can convert better than toll free numbers in at least some situations.

In one embodiment, local telephone numbers of the connection server are assigned to the advertisements based on a number of considerations. For example, when the service area of the advertiser is small, a local telephone number representative of the service area can be assigned to the advertisement. For example, when the request for advertisements includes a location based query criterion, a local telephone number representative of the area according to the location requirement can be assigned to the advertisement. For example, information about the location of the end user to who the advertisement is to be presented can be used to select the local telephone number. For example, the IP address of a query submitted from the end user can be used to determine the location of the user and assign a local telephone number accordingly. A telephone call to the local telephone number may or may not be toll free.

Figure 16:
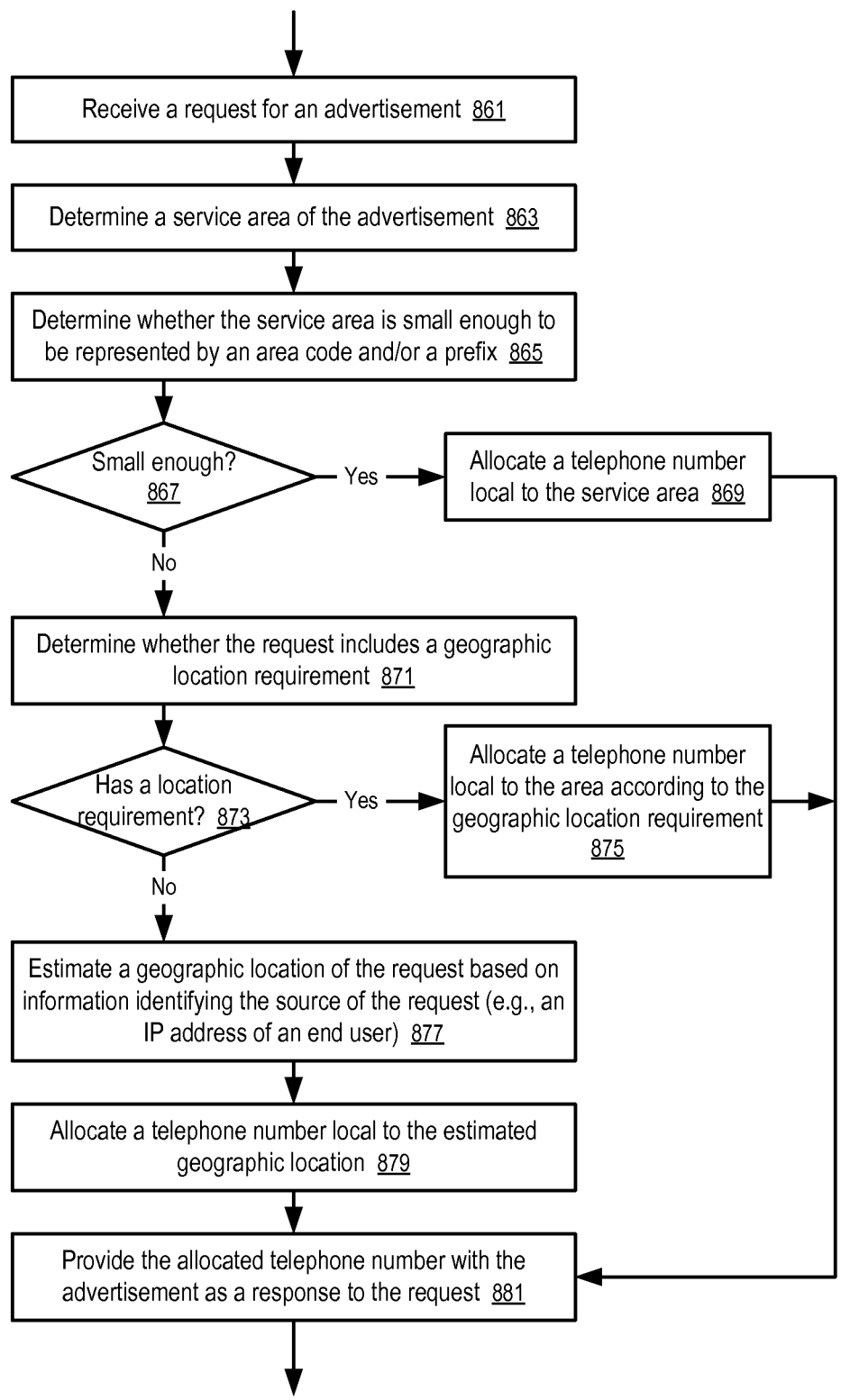
FIG. 16 shows a method to dynamically allocate local telephone numbers according to one embodiment.

FIG. 16 shows a method to dynamically allocate local telephone numbers according to one embodiment. In FIG. 16, after receiving (861) a request for an advertisement, such as a search request, a service area of the advertisement is determined (863). In one embodiment, the service area of the advertisement is part of the specification of the advertisement and can be looked up from the advertisement database.

In FIG. 16, it is determined (865) whether the service area is small enough to be represented by an area code and/or a prefix of a telephone number. If (867) it is small enough, a telephone number local to the service area is allocated (869) for the advertisement; and the allocated telephone number is provided (881) with the advertisement as a response to the request.

For example, when the service area of an advertisement is of a small, confined area, such as a zip code, city or region, the advertisement for a local area can be assigned a local telephone number according to the service address of the advertisement. For example, when Greg queries for a car dealer in San Francisco, an advertisement of a car dealer can be assigned a local telephone number that is representative of the service address of the car dealer. When Scott executes the same query, the same local number is returned in the same advertisement.

In FIG. 16, if the service area of the advertisement is not of a small, confined area, it is determined (871) whether the request includes a geographic location requirement. If (873) the request includes a location requirement, a telephone number local to the area according to the geographic location requirement is allocated (875) for the advertisement.

For example, the location modifier of a query can be used to select the local number that is to be returned as the contact information of the advertisement. For example, Charlie's Boats has an advertisement with a service area covering California. When Greg queries for a boat dealer in San Francisco, the advertisement for Charlie's Boats is returned with a local number (e.g., 415-243-xxxx) that is representative of the San Francisco city. However, when Scott queries for a boat dealer in Los Angeles, the advertisement for Charlie's Boats is returned with a local number (e.g., 310-944-xxxx) that is representative of the Los Angeles city. The telephone calls from Greg and Scott, received at the different local numbers, can be connected to the same phone number of Charlie's Boats. Alternatively, when Charlie's Boats have different offices in California, the telephone calls from Greg and Scott can be connected to the nearest offices of Charlie's Boats.

In FIG. 16, if (873) the request includes no location requirement, a geographic location of the request is estimated (877) based on information identifying the source of the request (e.g., an IP address of an end user). A telephone number local to the estimated geographic location is allocated (879) and provided (881) with the advertisement as a response to the request.

For example, when no location information was provided in a query, the IP address of the query can be used to derive a telephone number that is local to the location from which the query is received. For example, Greg can execute a query from within San Francisco and be presented with an advertisement having a local telephone number (e.g., 415-243-xxxx) that is representative of the San Francisco city, while Scott can query from Los Angeles and be presented with an advertisement having a local telephone number (e.g., 310-944-xxxx) that is representative of the Los Angeles city.

For example, when the query is received from a cellular phone, a cellular base station that is in communication with the cellular phone can be used to estimate the location of the cellular phone. For example, when the request is received via a wireless access point, the location of the access point can be used to estimate the location of the requester. For example, when the request is received via a demand partner, the demand partner may provide a location indication about the request. For example, a location preference of a registered user can be used to estimate the location for the query from the user.

In one embodiment, when no accurate location can be estimated for the request to determine a local phone number, a toll free telephone number is allocated for the advertisement that has a wide service area.

In one embodiment, to limit the cost associated with building and managing inventory of many local numbers required to have coverage across one or more large geographical areas, local numbers with extensions could be used to uniquely represent different advertisers and/or other parameters to be tracked, such as the identities of the demand affiliates, bid prices, etc.

For example, different tiers of services can be provided for demand affiliates. For example, demand affiliate A that generates less than a threshold number of queries (e.g., one million a month) may be issued local numbers of the connection provider with different extensions for different advertisements. For example, demand affiliate B that generates more than a threshold number of queries (e.g., one million a month) may be issued local numbers of the connection provider without an extension.

Whether an advertisement is assigned a local number without an extension or a local number with an extension can be determined based on the performance of the advertisement. For example, advertisements received greater than a threshold number of calls (e.g., 100 calls a month) may be assigned local numbers without an extension, whereas advertisements received less than a threshold number of calls (e.g., 100 calls a month) can be assigned local numbers with extensions. For example, whether an advertisement is assigned a local number without an extension or a local number with an extension can be determined based an earning potential of presenting the advertisement via the demand affiliate, or a bid price of the advertiser, or the current availability of clean local telephone numbers.

Figure 17:
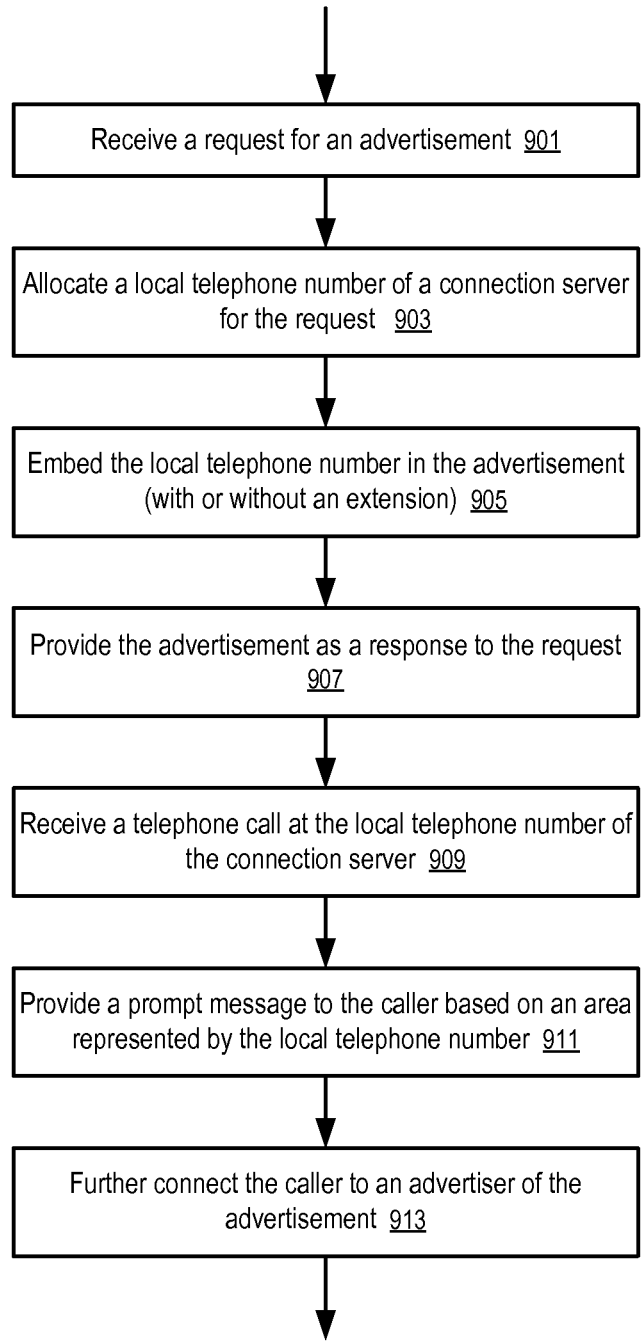
FIG. 17 shows a method to provide a voice connection via a local telephone number according to one embodiment.

FIG. 17 shows a method to provide a voice connection via a local telephone number according to one embodiment. In FIG. 17, after a request for an advertisement is received (901), a local telephone number of a connection server is allocated (903) for the request. The local telephone number is embedded (905) in the advertisement (with or without an extension). The advertisement is provided (907) as a response to the request.

In one embodiment, responsive to a request from a user, a telephone number is selected from a plurality of telephone numbers of a connection server to match a location indicator of the request. The selected telephone number to be embedded in the advertiser and be used by the user to initiate a telephone call to the connection server for further connection to an advertiser of the advertisement. In one embodiment, the plurality of telephone numbers are local to a plurality of different cities.

In one embodiment, the location indicator comprises a location search criterion submitted by the user as part of the request. In another embodiment, the location indicator of the request is determined based on an identifier of the user received with the request, such as a phone number of the user, an Internet address of the user, a member ID of the user, etc. In one embodiment, the location indication of the request is determined based on a location of a wireless access point used by the user to submit the request.

After a telephone call is received (909) at the local telephone number of the connection server, a prompt message is provided (911) to the caller based on an area represented by the local telephone number. The caller is further connected (913) to an advertiser of the advertisement.

In one embodiment, responsive to receiving the telephone call at the telephone number of the connection server from the user, it is determined whether to play a prompt message to the user, based at least in part on statistic data about telephone calls collected at the connection server, such as a number of calls connected to the advertiser within a predetermined period of time, a number of abnormal calls connected to the advertiser within a predetermined period of time, a number of calls received from the user within a predetermined period of time, etc.

In one embodiment, a prompt message is played in the telephone call to the user in response to a determination that the number of calls connected to the advertiser is below a threshold within the predetermined period of time.

In one embodiment, a prompt message is played to the user in response to a determination that the number of calls received from the user within the predetermined period of time is above a threshold; and the telephone call is connected to an interactive voice response (IVR) system or a human operator for an input from the user. After the required input is received via the IVR system or the human operator, the telephone call is connected to the advertiser.

In one embodiment, responsive to receiving the telephone call at the telephone number of the connection server from the user, it is determined whether to play a prompt message to the user based at least in part on an average speed of making calls by the user during a period of time. When the average speed is above a threshold, a prompt message is played to the user in the telephone call; the telephone call is connected to an interactive voice response (IVR) system or a human operator for an input from the user; and after the required input is received, the telephone call is further connected to the advertiser.

In one embodiment, responsive to receiving the telephone call at the telephone number of the connection server from the user, it is determined whether to play a prompt message to the user based at least in part on whether a valid telephone number of the user can be determined via an automatic number identification (ANI) service. When no valid telephone number of the user can be determined from the ANI service, a prompt message is played to the user in the telephone call to terminate the telephone call.

In one embodiment, responsive to receiving the telephone call at the telephone number of the connection server from the user, it is determined whether to play a prompt message to the user based at least in part on a preference received from the user prior to the telephone call. For example, the user may specify the preference of "no prompt", "always prompt" or "let the system decide". Different sets of options can be offered in different embodiments.

In one embodiment, the connection server can receive a first Voice over Internet Protocol (VoIP) call via a telecommunication carrier from the user using the telephone number provided in the advertisement, determine a telephonic reference of the advertiser based on the telephone number used receive the first VoIP call, initiate a second Voice over Internet Protocol (VoIP) call via a telecommunication carrier to the advertiser using the telephonic reference of the advertiser, and bridge the first and second VoIP calls to connect the user and the advertiser. In one embodiment, a media connection that does not go through the connection server is established to connect the user and the advertiser and to bridge the first and second VoIP calls.

In one embodiment, responsive to receiving the telephone call at the telephone number of the connection server from the user, a prompt message in the telephone call is customized for the user based on a geographic area represented by the telephone number. For example, the prompt message can be customized to identify the advertiser when a location of the user as determined for the telephone call is outside the geographic area represented by the telephone number.

In one embodiment, the advertiser is to be charged an advertisement fee responsive to the connection server connecting the telephone call of the user to the advertiser; and the advertisement fee is determined based on a bid price specified by the advertiser.

In one embodiment, the connection server is configured to customize prompts presented during the process of establishing connections between callers and callees, based on information such as the identity of the callers, etc. For example, interactive voice response (IVR) prompts configured for setting up accounts and/or for collecting payment information can be skipped if the identity of the caller and/or the respective account/payment information can be securely identified by the call itself (e.g., based on an automatic number identification (ANI) service, a caller identification service, etc.).

For example, the IVR prompts may be customized in a language selected based on the preference of the caller. In one embodiment, one or more listings provided to the caller to present callees may include the language capability of the callees that may provide services of interest to the caller, and the caller may select a preferred language in searching for service providers. Alternatively or in combination, the caller may select a language preference in an account setup for the caller, and thus, when the identity of the caller is determined from the call, the language preference of the prompts can be determined in an automated way in accordance with the language preference of the caller. The IVR prompts can be configured to allow the caller to further change the prompt language for the current call, and the language preference of the caller can be determined based on historic language selection patterns in establishing previous connections for previous requests for the same caller, or similar callers in the same geographic region.

In one embodiment, the connection server is further configured to selectively connect the caller to a human operator, or the IVR system, to collect payment information in setting up an account for the caller. For example, certain groups of users or users in certain regions may generally prefer interacting with human operators for making payments rather than interacting with an IVR system, and other users may prefer interacting with an IVR system rather than a human operator. The information about the caller determined from the call itself can be used to customize the prompt and/or routing for the payment processing to reduce the need for switching and/or further prompts.

In one embodiment, a mobile web page is provided to improve the user experience when a mobile device is used to request the connections. The mobile web page allows the user, consumer, or caller to sign in using a username and a password and view listings of service providers, advisers, or callees. The mobile web page running on the mobile device is configured to be associated with the payment information or account information of the user. Access to the mobile web page for fee-based services is secured via the username and the password and/or other security measures known in the field, such as security token/devices, biometric authentication (biometrics), etc. Thus, when a connection request is identified to be from the mobile device, the payment information or account information of the user can be applied without the respective prompts.

In one embodiment of preventing unauthorized use of the mobile device and thus the payment information or account information of the user, the mobile web page is configured to register the mobile device with the payment information or account information of the user for a predetermined period of time, when the mobile web page is determined to be used by an authorized user. During the predetermine period of time in which the mobile device is associated with the payment information or account information of the user, an incoming call from the mobile device can be determined to be authorized to use the associated payment information or account information of the user for services provided in the incoming call.

For example, when the "call now" button of a listing of a service provider, adviser, or callee is clicked within the mobile web page, the mobile web page is configured to transmit a message from the mobile device to the connection server to register the mobile device with the user account/payment information configured for the mobile web page. The "call now" button is also configured to instruct the mobile device to initiate a call (e.g., via an Application Programming Interface (API)) provided by the platform of the mobile device. When the connection server receives the call initiated by the mobile device, the connection server identifies the mobile device and/or the caller, based on information transmitted with the call. For example, the mobile device may be identified based on caller identification information, an automatic number identification (ANI) service, handshake data in a VoIP call, etc. If the call is determined from the mobile device and received within the time period for associating the mobile device and the payment information or account information of the user, the fund source as identified by the payment information or account information of the user is authorized to pay for the services provided via the communication connection established for the call, and the portion of the IVR prompts related to account setup and payment processing can be skipped. Otherwise, the caller is presented with IVR prompts to authenticate the user for using the payment information or account information of the user, or set up a separate account and/or provide alternative payment methods.

Figure 18:
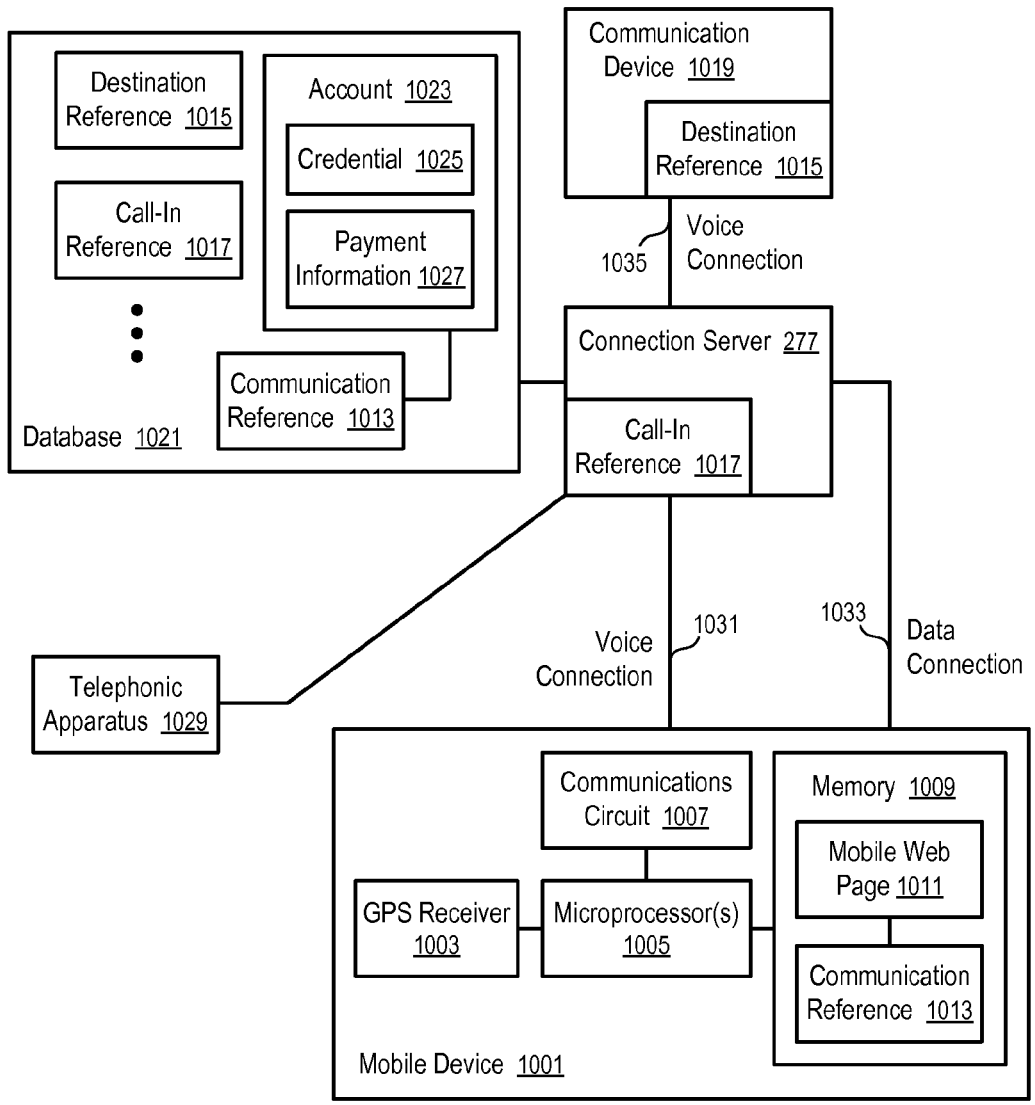
FIG. 18 shows a system to provide voice connections according to one embodiment.

FIG. 18 shows a system to provide voice connections according to one embodiment. In FIG. 18, a user may use a telephonic apparatus (e.g., 1029) to call the connection server (277) (e.g., as illustrated in FIG. 7, or a similar connection server (255) illustrated in FIG. 6) using a call-in reference (1017), such as a telephone number, a VoIP identifier for a party in a call, etc.

When the telephonic apparatus (1029) is not pre-associated with payment information, the call from the telephonic apparatus (1029) is routed to an IVR system of the connection server (277) to process payment for the call, prior to the call being routed to the intended destination (e.g., communication device (1019) of a service provider, adviser, or callee).

In FIG. 18, a mobile web page (1011) is provided in a memory (1009) of a mobile device (1001). A communication reference (1013) identifies the mobile device (1001). The mobile device (1001) is configured to authenticate a user of the mobile device (1001) for the use of the mobile web page. The authentication may be performed via a credential (1025) of an account (1023). For example, if the user presents a credential matching the credential (1025) stored in the account (1023), the user is authorized to use the mobile web page (1011) in connection with the account (1023). Otherwise, the mobile web page (1011) does not provide services in connection with the account (1023). The user may provide a proper credential for a different account, or use the mobile web page (1011) in an anonymous mode. The mobile web page (1011) may require re-authentication of the user after an inactive period, or after the user signs off the session, to prevent authorized use of the account (1023).

In FIG. 18, the account (1023) includes payment information (1027) that identifies a funding source for the payment of services provided in the account (1023). For example, the payment information (1027) may include a credit card number to pay for service charges. For example, the account (1023) may have a stored value balance that represents funds prepaid to the connection server (277) for subsequent debiting for services provided in the account (1023). For example, the funding source may include a credit card number that can be charged to increase the stored value balance.

In FIG. 18, when the communication reference (1013) is stored in association with the account (1023) in a database (1021) of the connection server (277), in-coming calls identified with the communication reference (1013) are authorized to use the funds of the account (1023). When the communication reference (1013) is not associated with the account (1023) in the database (1021), in-coming calls identified with the communication reference (1013) are provided with IVR prompts to identify and/or establish funds for the respective calls.

In FIG. 18, during the time period in which the user has been authenticated to use the mobile web page (1011), the mobile web page (1011) is configured to transmit a message via a data connection (1033) to the connection server (277) to associate the communication reference (1013) of the mobile device (1001) with the account (1023) for which the user has been successfully authenticated using the credential (1025). The message allows the connection server (277) to associate the communication reference (1013) with the account (1023) for a predetermined period of time. After the predetermined period of time, the association is no longer valid.

For example, the mobile web page (1011) can be configured to transmit the message to associate the communication reference (1013) with the account (1023) in the database (1021) in response to a request received in the mobile web page (1011) for a connection to a selected service provider, adviser, or callee. Further, to improve security, the predetermined time period for association is based on the expected time period for a call from the mobile device (1001) to reach the connection server (277).

For example, when a "call now" button or link (e.g., 1059 illustrated in FIG. 19) is activated to request a call to the communication device (1019) identified by the destination reference (1015) in a communications network, the mobile web page (1011) executed by microprocessor(s) (1005) of the mobile device (1001) causes a communications circuit (1007) to establish a voice connection (1031) with the connection server (277) identified by the call-in reference (1017) in the communications network. To determine the funding source of the call received from the mobile device (1001), the connection server (277) checks the database (1021) to determine whether the communication reference (1013) is associated with an account (e.g., 1023). When the call is received within the predetermined time period of association between the communication reference (1013) and the account (1023) (established via the message containing the identification of the communication reference (1013) and the account (1023) and transmitted from the mobile web page (1011) to the connection server (277) via the data connection (1033) in response to the activation of the "call now" button or link), the fees for the call can be charged to the account (1023), the IVR prompts for account setup, or user authentication can be skipped.

In one embodiment, when the "call now" button or link is selected, the message transmitted from the mobile web page (1011) via the data connection (1033) to the connection server (277) further includes other information such as the identifier of the communication device (1019) of the service provider, adviser, or callee. The identifier is generally different from the destination reference (1015) to protect the privacy of the service provider, adviser, or callee, such that the mobile device (1001) is prevented from making a direct connection with the communication device (1019) of the service provider, adviser, or callee. In response to the message, the connection server (277) is configured to look up the destination reference (1015) associated with the identifier and initiate a call from the connection server (277) to the communication device (1019) identified by the destination reference (1015).

In one embodiment of the connection server (277), when the message responsive to the activation of the "call now" button or link is received, the connection server (277) initiates the call to the destination reference (1015) while waiting for the call from the mobile device (1001). Alternatively, the connection sever (277) may initiate the call to the destination reference (1015) after the call from the mobile device (1001) is received. Alternatively, the connection sever (277) may redirect or forward the call from the mobile device (1001) to the destination reference (1015).

Figure 19:
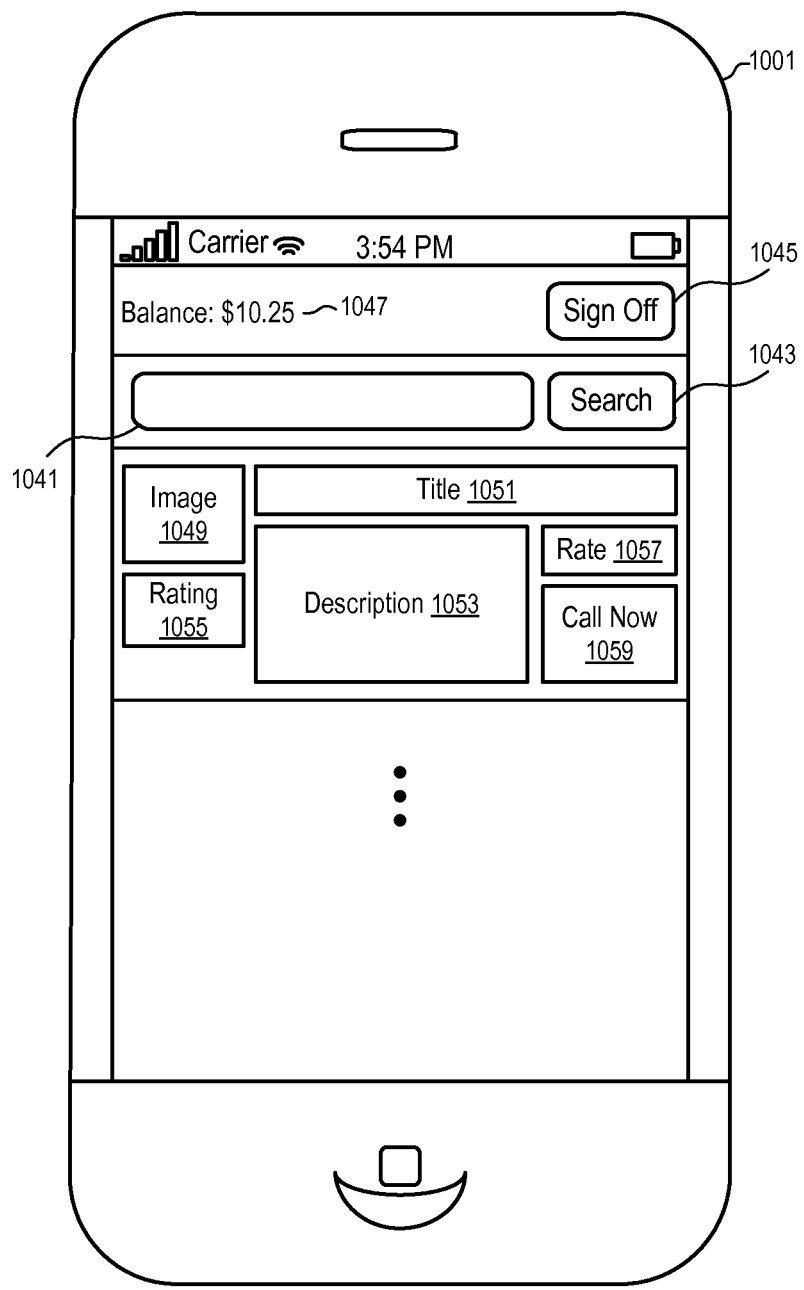
FIG. 19 illustrates a user interface of a mobile web page configured to provide communication connections according to one embodiment.

FIG. 19 illustrates a user interface of a mobile web page (such as 1011) configured to provide communication connections according to one embodiment. For example, the mobile web page (1011) executed in the microprocessor(s) (1005) of the mobile device (1001) illustrated in FIG. 18 may provide the user interface illustrated in FIG. 19.

In FIG. 19, the mobile web page (1011) shows a balance (1047) of the stored value in the account (1023), after the user signs in the account (1023) using a credential matching the credential (1025) stored in the account (1023).

In FIG. 19, the user may select a "sign-off" button or link (1045) to use the application in an anonymous mode (or to lock the application).

In FIG. 19, the user interface presented by the mobile web page (1011) is configured to present listings of service providers, advisers, or callees, which may provide services of interest to the user of the mobile device (1001). For example, the user interface includes an entry box (1041) to receive search criteria and a "search" button or link (1043) to request a search. The user interface may provide other tools to selectively present service providers, advisers, or callees, such as categories, directories, randomly selected top-rated callees, etc.

In FIG. 19, a typical listing includes an image (1049) of the service provider, adviser, or callee; a rating (1055) of the service provider, adviser, or callee as determined by feedback from prior customers of the service provider, adviser, or callee; a title (1051) of the services offered; a description of the services and/or the service provider, adviser, or callee; a rate (1057) of the service charges specified by the service provider, adviser, or callee; and a "call now" button or link (1059) for requesting a connection to the service provider, adviser, or callee.

Figure 20:
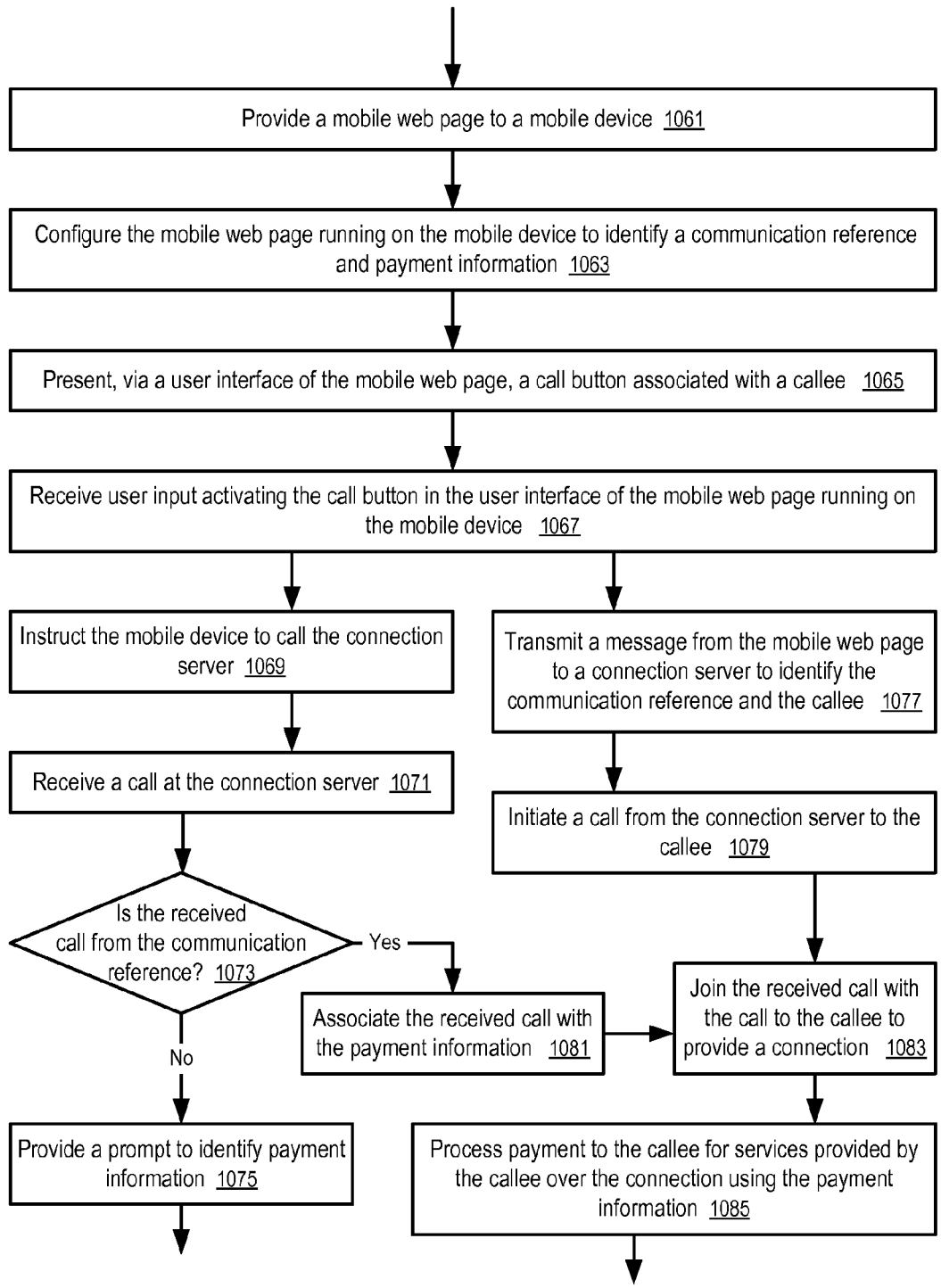
FIGS. 20 and 21 show methods to customize prompts according to some embodiments.
Figure 21:
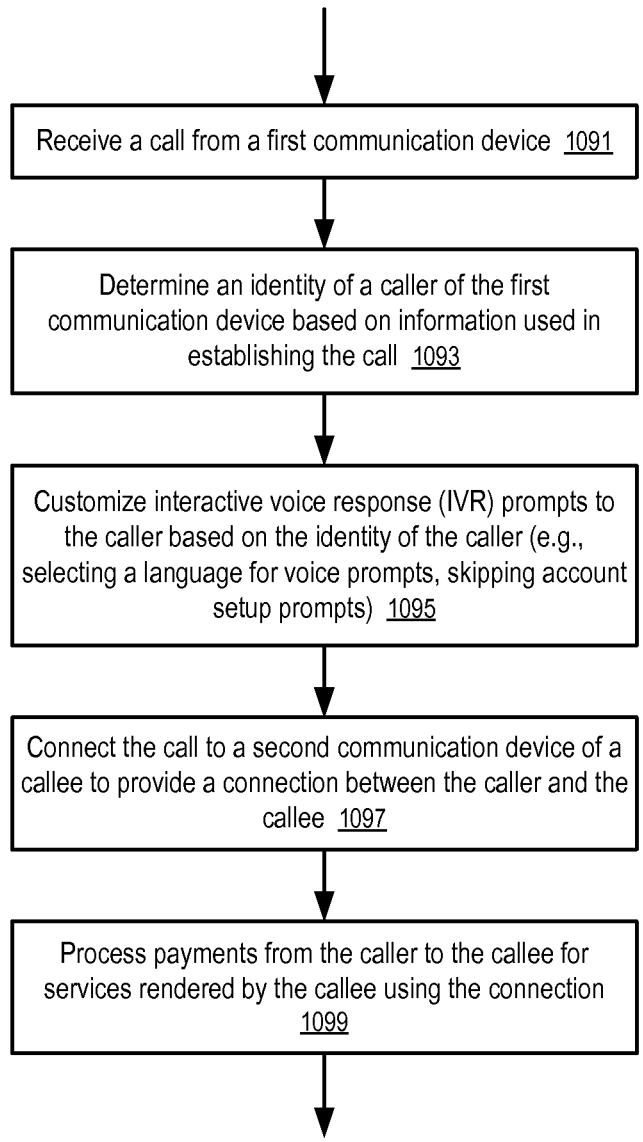

FIGS. 20 and 21 show methods to customize prompts according to some embodiments.

For example, in one embodiment, the system illustrated in FIG. 18 with a mobile device (1001) having a mobile web page (1011) showing a user interface illustrated in FIG. 19 is configured to perform the method of FIG. 20 and/or FIG. 21.

In FIG. 20, the connection server (277) provides (1061) a mobile web page (1011) to a mobile device (1001). The mobile web page (1011) running on the mobile device (1001) is configured (1063) to identify a communication reference (1013) and payment information (1027). The mobile device (1001) presents (1065), via a user interface of the mobile web page (1011), a call button (1059) associated with a callee of a communication device (1019).

After the mobile device (1001) receives (1067) user input activating the call button (1059) in the user interface of the mobile web page (1011) running on the mobile device (1001), the mobile web page (1011) instructs (1069) the mobile device (1001) to call the connection server (277) using the call-in reference (1017) and transmits (1077) a message to the connection server (277) to identify the communication reference (1013) and the callee of the communication device (1019). In response to the message from the mobile web page (1011), the mobile device (1001) initiates (1079) a call from the connection server (277) to the destination reference (1015) of the callee.

After the connection server (277) receives (1071) a call, the connection server (277) determines (1073) whether the received call is from the communication reference (1013), and if so, the connection server (277) associates (1081) the received call with the payment information and thus skips the IVR prompts for setting up payment for the call. The connection server (277) joins (1083) the call received from the mobile device (1001) with the call placed to the destination reference (1015) of the callee to provide a connection, and processes (1085) payment to the callee for services provided by the callee over the connection using the payment information (1027).

If the received call is not from a communication reference pre-associated with payment information (e.g., 1027), the connection server (277) provides (1075) a prompt to identify the payment information (1027).

In FIG. 21, the connection server (277) receives (1091) a call from a first communication device (e.g., mobile device 1001) and determines (1093) an identity of a caller of the first communication device (e.g., mobile device 1001) based on information used in establishing the call (e.g., caller ID, ANI, VoIP handshake, etc.). The connection server (277) customizes (1095) interactive voice response (IVR) prompts to the caller based on the identity of the caller (e.g., selecting a language for voice prompts, skipping account setup prompts, etc.). After connecting (1097) the call to a second communication device (e.g., 1019) of a callee to provide a connection between the caller and the callee, the connection server (277) processes (1099) payments from the caller to the callee for services rendered by the callee using the connection.

Figure 22:
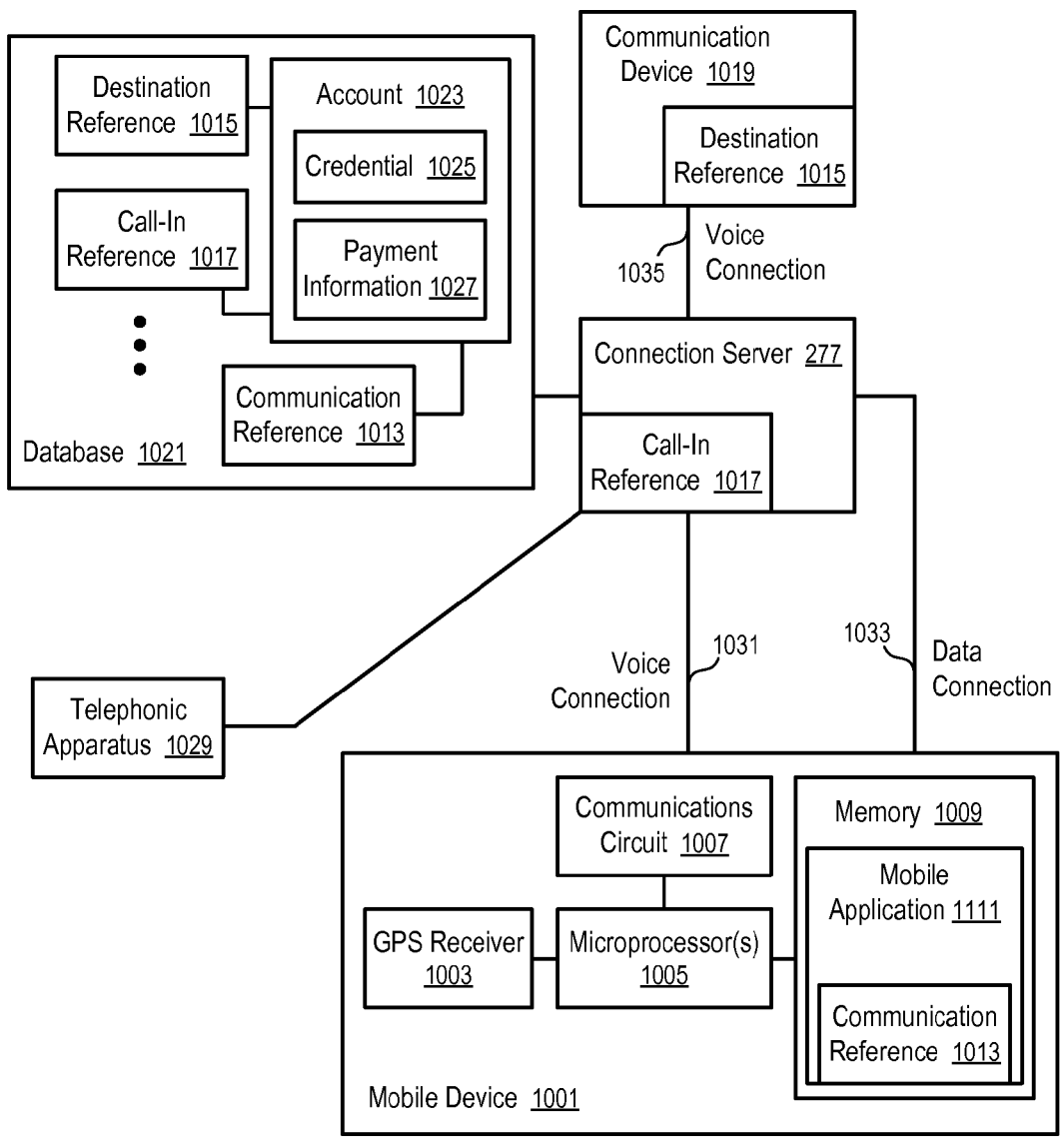
FIG. 22 shows a system to provide voice connections via a mobile application according to one embodiment.

FIG. 22 shows a system to provide voice connections via a mobile application according to one embodiment.

In FIG. 22, during the installation of a mobile application (1111) downloaded from the connection server (277) for installation on the mobile device (1001), the mobile application (1111) is customized for the mobile device (1001) to include the communication reference (1013). Thus, when the mobile application (1111) is used to request a communication connection, the communication reference (1013) configured in the mobile application (1111) is used to identify the communication device of the user of the mobile application (1111). The communication connection is connected to the user according to the communication reference (1013).

In FIG. 22, the mobile application (1111) is configured to store the communication reference (1013). Alternatively, an identifier uniquely associated with the communication reference (1013) in the database (1021) can be used to represent the communication reference (1013) in the mobile application (1111).

In FIG. 22, access to the mobile application (1111) is controlled via the credential (1025), such as username and password, for improved security. The mobile application (1111) may communicate with the connection server (277) via the data connection (1033) to verify the credential (1025) entered by the user to access the mobile application (1111), or be customized to verify the credential (1025) locally on the mobile device (1001) with the need to communicate with the connection server (277). After the credential (1025) is entered by the user, the mobile application (1111) allows the user to use the mobile application (1111) to request communication connections until the user signs off or a predetermined idle time is reached.

The mobile application (1111) may provide a user interface similar to that illustrated in FIG. 19. When the call now button (1059) is selected, the call may be initiated from the mobile device (1001) to the connection server (277) using the call-in reference (1017), or be initiated from the connection server (277) to the mobile device (1001) using the communication reference (1013).

For example, when the call now button (1059) is selected, the mobile application (1111) transmits a request to the connection server (277) over the data connection (1033). The request identifies the communication reference (1013) and an identifier of the callee associated with the call now button (1059).

In one embodiment of a response to the request generated by the selection of the call now button (1059), the connection server (277) calls the mobile device (1001) at the communication reference (1013) to establish the voice connection (1031).

In another embodiment of a response to the request generated by the selection of the call now button (1059), the connection server (277) provides a call-in reference (1017) to the mobile application (1111) to cause the mobile application (1111) to request the mobile device (1001) to call the connection server (277) using the call-in reference (1017). When a call from the mobile device (1001) having the communication reference (1013) is received in the connection server (277), the call is identified to be from the communication reference (1013), and thus is associated with the request generated by the selection of the call now button (1059) for further connection to the callee's communication device (1019).

The call-in reference (1017) can be dynamically associated with the mobile device (1001) identified by the communication reference (1013) for improved security. For example, the connection server (277) has a plurality of call-in references (e.g., 1017). When the call now button (1059) is activated (or presented to the mobile device (1001)), a particular call-in reference (1017) is selected for the communication reference (1013). The database (1021) stores data to associate the call-in reference (1017) with the communication reference (1013) directly or indirectly via the account (1023). During the time period, the call-in reference (1017) is associated with the communication reference (1013) and the call received from the mobile device (1001) is authenticated via matching both the call-in reference (1017) used to call the connection server (277) and the communication reference (1013) used to identify the mobile device (1001) for the call (e.g., caller ID or ANI). If the pair of calling reference and called reference matches the pair of the communication reference (1013) and the call-in reference (1017) linked in the database (1021), the call is accepted and authorized to use the account (1023) for payments associated with the call. Otherwise, the call may be rejected, or the caller is provided with an IVR prompt for authentication, or setting up a new account.

The association of the call-in reference (1017) with the communication reference (1013) can be limited to a predetermined period of time after the activation of the call now button (1059). Since the call generated by the mobile application (1111) is expected in a short period of time, the association can be set to expire in a short period of time (e.g., less than a minute).

For example, the mobile application (1111) may communicate with the connection server (277) to associate a call-in reference (1017) to the communication reference (1013) of the mobile device (1001), based on web activity before the activation of the call now button (1059), or in response to the activation of the call now button (1059), to allow the call generated from the call now button (1059) presented in the mobile application (1111) to be routed to the callee selected by the customer. The identification of the callee is based on the call-in reference (1017) used to receive the call at the connections server (277) and/or the communication reference (1013) that identifies the originator of the call. Thus, different customers calling the same call-in reference (1017) can be connected to the respective callees selected by the respective users of the mobile applications (e.g., 1111).

The association of the call-in reference (1017) with the communication reference (1013) to represent a valid combination for a call for call authentication can be implemented just in time in response to the activation of the call now button (1059) to reduce the time period to which a call-in reference (1017) is allocated. The association is removed after a call from the communication reference (1013) to the call-in reference (1017) is received and validated in the connection server (277). The association is set to expire after a predetermined period of time if the association is not removed in response to the matching call.

Different call-in references (e.g., 1017) can be dynamically allocated to a same mobile device (e.g., 1001) at different times to improve account security (e.g., to defeat Call-ID-spoofing based fraud). Thus, a fraudulent device configured to appear to have the communication reference (1013) in making a call to a non-matching call-in reference (e.g., other than 1017) of the connection server (277) cannot pass the authentication/validation that is based on the association of the particular call-in reference (1017) and the communication reference (1013).

In FIG. 22, after the call received in the call-in reference (1017) is authenticated and/or validated, based on the call-in reference (1017) dynamically assigned to the mobile application in response to the activation of the call now button (1059), the call can be identified as a result of the activation of the call now button (1059) and further connected to the communication device (1019) identified by the call now button (1059) presented in the mobile application (1111). Further, the authenticated and/or validated call can be identified as being funded by the account (1023) associated with the use of the mobile application (1111), if the use of the mobile application (1111) is authorized via the authentication performed based on the credential (1025) of the account (1023) (e.g., after the user signs into the mobile application (1111) using the correct credential (1025)).

Since the funding account (1023) and the callee can be automatically determined by the connection server (277) from the calling reference (e.g., the communication reference (1013) of the mobile device (1001)) and the called reference (e.g., the call-in reference (1017)) of the incoming call using the above discussed systems and methods, the connection server (277) can be configured to skip IVR prompts related to the identification of the funding of the call and/or the callee in connecting the call to the communication device (1019) of the callee.

The funding source of the call can be a stored value account (1023), a mobile wallet implemented on the mobile device (1001), or other payment methods. For example, when a mobile wallet in the mobile device (1001) is used as a funding source of the call, the connection server (277) may communicate with the mobile application (1111) to charge the user of the mobile application (1111) for the services provided by the callee over the communication connection established via the connection server (277). For example, the mobile application (1111) may monitor the communication duration of the service and charge the mobile wallet for the service based on the communication duration determined by the mobile application (1111). Alternatively, the connection server (277) is configured to monitor the communication duration of the service provided over the connection and instruct the mobile application (1111) to charge the mobile wallet at the end of the connection. Alternatively, the system may charge the mobile wallet for a predetermined increment for stored value in the account (1023) when the balance of the account (1023) is below a threshold, and debit the stored value account for the services on the fly as the communication session of service over the connection progresses.

The mobile application (1111) may be configured to include payment information (e.g., a credit card number, a bank account, etc.) that can be used to pay for the services provided over the communication connection established via the mobile application (1111).

The account (1023) and/or the mobile application (1111) can be configured to established a customizable monthly spending budget. When the spending associated with the account (1023) and/or the mobile application (1111) is approaching the monthly spending budget, the mobile application (1111) is configured to provide a notification to the user on the mobile device (1001). When the monthly spending budget is reached, the mobile application (1111) is configured to disable the function for establishing connections via the connection server (277), until the next month or the monthly spending budget is increased.

Figure 23:
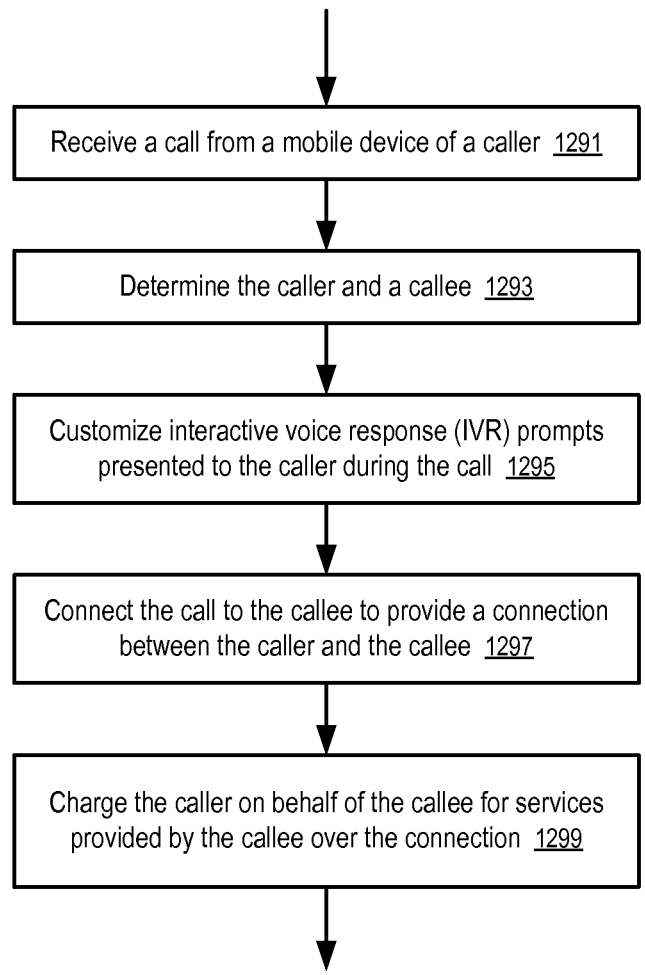
FIG. 23 shows a method to customize interactive voice response (IVR) prompts according to one embodiment.

FIG. 23 shows a method to customize interactive voice response (IVR) prompts according to one embodiment. In FIG. 23, a connection server (277) is configured to receive (1291) a call from a mobile device (1001) of a caller, determine (1293) the caller and a callee, customize (1295) interactive voice response (IVR) prompts presented to the caller during the call, connect (1297) the call to the callee to provide a connection between the caller and the callee, and charge (1299) the caller on behalf of the callee for services provided by the callee over the connection.

For example, a smart IVR system of the connection server (277) is configured to allow customized customer handling based on information known/gathered about individual customers. Information about a customer can be gathered from previous customer interaction with the system. The system may adapt to individual customers. For example, return customers could be identified and handled differently from new customers. Certain customers could be fast-tracked. Certain preliminary steps, requirements, etc. that would be presented to new customers could be automatically circumvented for return customers. For example, account setup/verification features may be skipped for certain return customers. A "customer-sticky" feature could adapt to previous customer interaction and automatically route the customer to persons/services of interest based on the previous customer interaction.

For example, all IVR prompts can be skipped if the customer is known and no ambiguity about adviser selected (e.g., based on past calling pattern, etc.), such that the call is connected by the connection server (277) to the communication device (1019) of the callee as if the call were made directly to the communication device (1019) without the caller being aware that the call is received at the connection server (277) and further connected to the communication device (1019) via a separate call.

For example, a mobile web page (1011), or a mobile application (1111), allows the user to sign in using the credential (1025), such as username and password, to identify the caller before the call is placed to the call-in reference (1017) of the connection server (277). The association among the call-in reference (1017), the communication reference (1013), and the callee can be stored in a call history log. If a subsequent call is made from the mobile device (1001) to the call-in reference (1017) (e.g., within a predetermined time period of the previous call), the connection server (277) can identify the call as being intended for the callee, based on the association among the call-in reference (1017), the communication reference (1013), and the callee in the call history log. Thus, the call can be associated with the account (1023) and the callee without presenting IVR prompts to identify the payment information (1027) and/or the callee. When the probability of the call being for the callee is above a threshold, the call can be connected to the communication device (1019) without the presentation of any IVR prompts.

The probability can be determined based on the time separation between the current call and the previous call that resulted in the association among the call-in reference (1017), the communication reference (1013), and the callee. The probability can be further determined based on the calling pattern of the caller associated with the call-in reference (1017), such as the timing of the call during the day, week and/or months; the locations from which the calls are made; etc.

The association among the call-in reference (1017), the communication reference (1013), and the callee may be established via the mobile web page (1011) or the mobile application (1111). For example, prior to or in response to the user clicking the call now button (1059), the payment information (1027) and/or the account (1023) of the user can be identified (e.g., via a sign-in process via the credential (1025) of the account (1023), an account setup user interface, or a user interface to receive the payment information (1027)). Subsequently, the call-in reference (1017) is associated with the communication reference (1013) and the callee. Subsequently, when a call is initiated from the mobile device (1001) to the call-in reference (1017) of the connection server (277) (e.g., automatically dialed by the mobile application (1111) or the mobile web page (1011), manually dialed by the user, or via a re-dialing function of the mobile device (1001)), the connection server (277) can automatically recognized the received call as being for the callee and funded by the account (1023) or the respective payment information (1027). Thus, the connection server (277) can connect the call to the communication device without playing IVR prompts.

If the probability of the call being directed to the previous callee is lower than a threshold, the connection server (277) is configured to present the IVR prompts to request confirmation of the callee.

If the probability of the call being authorized to use the account (1023) or the previous payment information (1027) for payment is lower than a threshold, the connection server (277) is configured to present the IVR prompts to request authorization for the use of the account (1023) and/or the previous payment information.

The IVR prompts may be provided in languages customized based on the locations of the callers. For example, when the call now button (1059) is activated to request a connection, the location of the mobile device (1001) can be transmitted to the connection server (277) with the request. The location of the mobile device (1001) can be used to identify a prevailing language used in the geographical area containing the location. The initial IVR prompts can be presented using the prevailing language.

Alternatively, the location of the call may be determined based on the communication reference (1013) and/or information about the telecommunication carrier that routed the call to the connection server (277).

Figure 24:
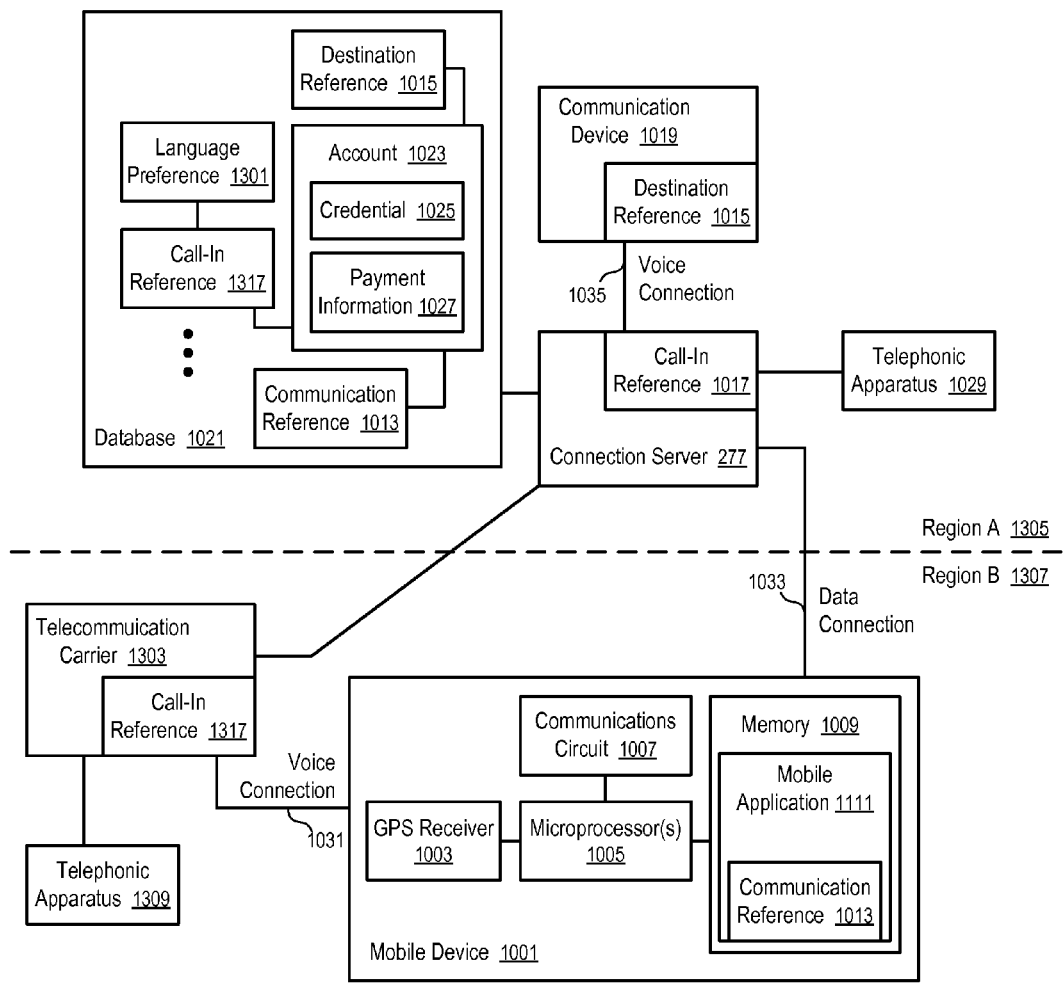
FIG. 24 shows a system to provide connections to users in different geographic regions according to one embodiment.

FIG. 24 shows a system to provide connections to users in different geographic regions according to one embodiment.

In FIG. 24, the callee of the communication device (1019) may provide services to users in different regions (e.g., 1305, 1307) via anonymous communication connections established via the connection server (277). For example, the regions (1305, 1307) may be in different counties or states where a telecommunication connection would typically involve international and/or long distance charges. Further, users in different regions (1305, 1307) may use different languages.

In FIG. 24, different call-in references are assigned to service users in different regions and/or users having different language preferences. For example, after the language preference of the user of the account (1023) is determined, the call-in reference (1317) associated with the language preference (1301) of the user is assigned to the user for calling the connection server (277) for an anonymous connection to the callee at the communication device (1019) identified by the destination reference (1015). The destination reference (1015) can be identified via the identifier of the call-now button (1059) (e.g., illustrated in FIG. 19) associated with the callee and selected by the user of the mobile device (1001) (e.g., when the call-now button (1059) is presented to the user as part of the listing of the callee).

The language preference (1301) can be determined by an option selected by the user from the listing presented to the user, the history of language selection of the user, and/or the location of the user. For example, the user may explicitly indicate that the location is in the region (1307) by selecting a location preference presented by the mobile web page (1011) or the mobile application (1111). For example, the location of the user can be determined from the IP address of the mobile device (1001) in using the data connection (1033), a location estimated by the mobile device based on a location of a wireless communication access point (e.g., a cellular communications tower, a wireless local area network access point, etc.), or a location as determined by a global positioning system (GPS) receiver (1003) of the mobile device (1001).

Thus, when the voice connection (1031) to the connection server (277) is established via the call-in reference (1317), IVR prompts provided to the user in the voice connection (1031) are presented in accordance with the language preference (1301) associated with the call-in reference (1317).

In FIG. 24, a call-in reference (1317) local to the mobile device (1001) of the user is presented to the user and/or the mobile device (1001). The call-in reference (1317) is local to avoid and/or reduce international and/or long distance charges.

For example, to reduce the cost of setting up multiple connection servers in different regions, the connection server (277) is configured in one region (1305), and an arrangement is made with a telecommunication carrier (1303) in a different region (1307) to route calls received at the call-in reference (1317) to the connection server (277). For example, the telecommunication carrier (1303) may terminate the call to the call-in reference (1317) via a virtual softphone and further connect the call to the connection server (277) via a packet-switched network (e.g., Internet), in a way as illustrated in FIG. 7. Thus, the international and/or long distance charges for the user of the mobile device (1001) and/or the connection server (277) can be reduced or eliminated.

Alternatively, multiple connection servers similar to the connection server (277) can be configured in different regions to receive calls at local call-in references (1017), and the connection servers (277) are interconnected via a packet-switched network (e.g., Internet).

When the international and/or long distance charges are reduced, the callee may target the services to users residing in different regions (e.g., 1305, 1307), as if the users were in the same region (e.g., 1305) local to the communication device (1019) of the user. The callee may request a single price for the services provided over the connections established via the connection server (277), regardless of the differences in regions in which the users reside.

Alternatively, the connection server (277) may collect a fee for the cost of the communication connection between the telecommunication carrier (1303) and the connection server (277). For example, when the call-in reference (1317) is presented for a local voice connection for the mobile device (1001), the price specified by the callee can be automatically adjusted by the connection server (277) to include the international and/or long distance charge for the connection between the telecommunication carrier (1303) and the connection server (277).

In one embodiment, the connection server (277) is configured to present both the local call-in reference (1317) and/or the direct call-in reference (1017). When the mobile device (1001) uses the local call-in reference (1317), a fee covering the expense for forwarding the calls from the telecommunication carrier (1303) to the connection server (277) across the international boundaries and/or over long distances are added to the charges to the account (1023) of the user. When the mobile device (1001) uses the direct call-in references (1017), the telecommunication carrier of the mobile device (1001) charges the user for the international and/or long distance call from the mobile device (1001) to the connection server (277) at the direct call-in reference (1017), and thus, the connection server (277) does not charge the user for the international and/or long distance fees. Since the local call-in reference (1317) and the direct call-in reference (1017) provide different options for the user to pay for the international and/or long distance call, the user has the freedom to select an option based on cost and/or performance considerations.

In FIG. 24, when the mobile device (1001) is in a country or region (1307) that uses a currency different from the currency used in the country or region (1305) of the callee, the connection server (277) is configured to perform currency conversions for the callee. Thus, the callee may specify a single price for service provided by the callee, and the connection server (277) determines different prices for customers of the callee in different regions, taking into account the currency differences, international and/or long distance charges, and/or the freedom to pay the international and/or long distance charges directly to the telecommunication carrier (1303) (e.g., by using the direct call-in reference (1017)) or indirectly to the connection server (277) (e.g., by using the call-in reference (1317) local to the device of the user, such as the mobile device (1001) or a telephonic apparatus (1309)).

In one embodiment, the connection server (277) is configured to selectively propagate location information of the callee to the user seeking the services of the callee in a way that does not compromise the privacy of the callee. The location information is provided at a coarse granularity that is configurable based on the preference of the callee and/or the requirement of the field of services provided by the callee. For example, the coarse granularity ensures that the identity of the callee is not revealed. For example, the local information of the callee may be provided at the level of city, state, country, time zone, continent, etc. To ensure privacy of the callee, the location indication of the callee is identified to be in a region wide enough such that at least a threshold of callees providing similar services are in the identified region (e.g., city, state, country, time zone, continent, etc.). For example, the callee may specify a smallest region in which the callee can be identified to potential callers. The location information of the callees can assist the customers in selecting the best callees to satisfy the needs of the customers. The location of the callee may be identified to the potential customers using the listing (e.g., presented via the mobile web page (1011) or mobile application (1111)), or via the IVR prompts provided over the voice connection (1031)).

Similarly, the connection server (277) is configured to selectively propagate location information of the customer to the callee providing the services of the customer in a way that does not compromise the privacy of the customer. The location information is provided at a coarse granularity that is configurable based on the preference of the customer and/or the characteristics of the field of services provided by the callee. For example, the coarse granularity ensures that the identity of the customer is not revealed. For example, the local information of the customer may be provided at the level of city, state, country, time zone, continent, etc. To ensure privacy of the customer, the location indication of the customer is identified to be in a region wide enough such that at least a threshold of users seeking similar services are in the identified region (e.g., city, state, country, time zone, continent, etc.). For example, the customer may specify a smallest region in which the customer can be identified to the callee. The location information of the caller can assist the callee in customizing services to best satisfy the needs of the customers.

For example, when the user is in the region (1307), the customer ratings of the callee at the communication device (1019) and/or comments for the past services provided the callee can be filtered based on the region (1307). For example, in computing an average customer rating for the callee, the ratings provided by the customers of the callee residing out of the region (1307) may be excluded to provide a more accurate rating for the needs of customers similar to the user residing in the region (1307). Similar, the comments provided by the customers located outside the region (1307) may be filtered out to allow the potential customers in the region (1307) to focus on more relevant comments.

For example, the connection server (277) is configured to present a user interface (e.g., on the mobile device (1001)) to selectively filter ratings and/or comments based on regions explicitly identified by the user. Alternatively, the connection server (277) may automatically detect the region (1307) and turn on the filter for the user, via the mobile web page (1011) or the mobile application (1111).

In one embodiment, the connection server (277) is configured to determine the rating difference between the unfiltered user ratings and the user ratings filtered based on the region (1307) of the user of the mobile device (1001). When a difference above a threshold is detected, the difference is presented (and/or the location filter is applied automatically for the user).

Using the system disclosed above, a service provider (e.g., callee) can provide services to international customers (e.g., users of the mobile device (1001) and the telephonic apparatus (1309)) without the worry of international communication charges and privacy issues, while tailoring services to different customers in different countries and regions.

Figure 25:
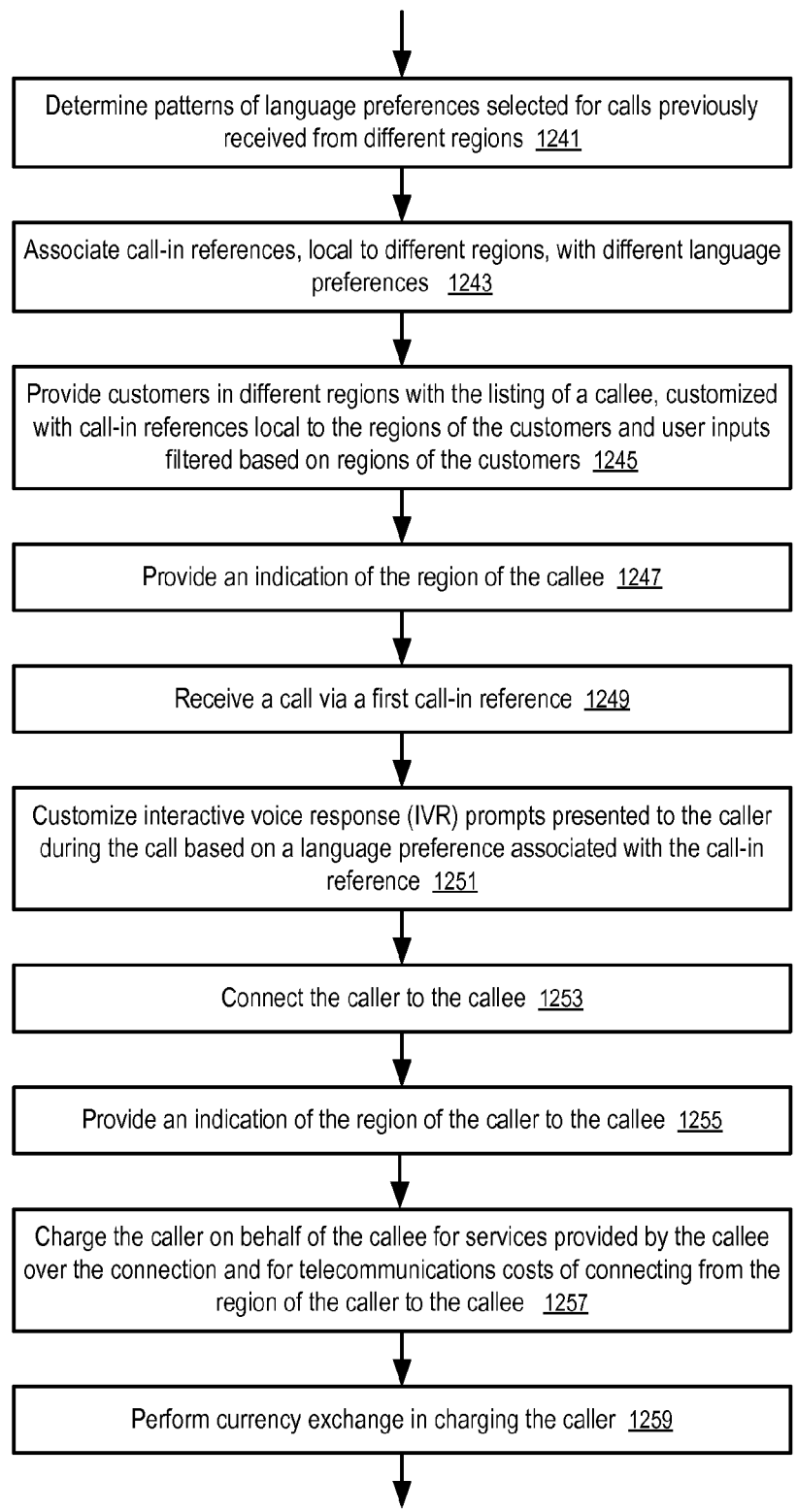
FIG. 25 shows a method to provide connections to users in different geographic regions according to one embodiment.

FIG. 25 shows a method to provide connections to users in different geographic regions according to one embodiment. For example, the method of FIG. 25 can be used in the system illustrated in FIG. 24.

In one embodiment, a connection server (277) is configured to use a plurality of call-in references (e.g., 1317, 1017) to receive calls from callers. A call received at a local telecommunication carrier (e.g., 1303) or a similar server can be further connected to a centralized connection server (277) for interactive voice response (IVR) prompts. Alternatively, a plurality of connection servers can be positioned in different regions to provide interactive voice response (IVR) prompts. The connection server (277) providing the IVR prompts can further connect the calls to the respective callees, after the identification of callers, payment information for settling the cost of the calls, and the callees.

In FIG. 25, a connection server (277) is configured to determine (1241) patterns of language preferences selected for calls previously received from different regions. For example, different callers from the same region (e.g., 1307) may have different language preferences. Based on the timing of the calls and other parameters (e.g., sub-regions with in the region (1307)), one or more dominant language preferences of clusters of calls can be identified. The language preferences can be associated with the local call-in reference for the region (1307) designed to receive local calls from the customers in the region (1307). When a received call is determined to be in one of the call cluster, the dominant language preference of the cluster can be used as the default language preference of the received call.

In FIG. 25, the database (1021) is configured to store data associating (1243) call-in references (e.g., 1317, 1017), local to different regions (e.g., 1307, 1305), with different language preferences (e.g., 1301).

The connection server (277) is configured to provide (1245) customers in different regions (e.g., 1307, 1305) with the listing of a callee, where the listing is customized with call-in references (e.g., 1317, 1017) local to the regions of the respective customers.

In one embodiment, the listing is further customized with user inputs filtered based on regions (e.g., 1307, 1305) of the customers. For example, for the services provided by the callee in the past, the callers who have received the services may provide feedbacks, ratings, comments, etc. The user input from the callers in different regions can be filtered by the region (e.g., 1307) of a potential caller who is receiving the listing. Thus, the potential caller may view the ratings, feedbacks, comments from other callers who are in the same region (1307) as the potential caller. For example, a user residing in the region (1307) may request that the ratings, feedbacks, comments be filtered based on another region (1305) identified by the user (e.g., when the user believes that his/her situation is closer to the users in the specific region (1305), instead of the region (1307) in which the user is currently residing).

In one embodiment, the connection server (277) is configured to provide (1247) an indication of the region (1307) of the callee over the data connection (1033), and/or the voice connection (1031). To protect the privacy of the callee, the size of the region (1307) is based on the number of other callees in the same region (1307) and providing the same services. In one embodiment, the connection server (277) is configured reduce the size of the identified region of the callee according to a predetermined scale (e.g., country, state, country, city, zip code, neighborhood), until further reducing the size would identify the callee to be in a region having few than a threshold number of callees in the same region providing similar services. Thus, the region of the callee identified to the caller includes at least a threshold number of callees providing the same area of services.

In some embodiments, the threshold is determined by the system based on the area of services. In some embodiments, a callee may identify the threshold as a preference.

In FIG. 25, after the connection server (277) receives (1249) a call via a first call-in reference, the connection server (277) is configured to customize (1251) interactive voice response (IVR) prompts presented to the caller during the call based on a language preference associated with the call-in reference.

In one embodiment, the language preference associated with the call-in reference (1317) is used as a default language preference for the call, in absence of other indication of the language preferences, which may be sent the caller via the data connection (1033) as a result of a selection of an option in the listing of the callee, or specified by the caller over the voice connection.

For example, the call may be received at the call-in reference (1317) in the region (1307) and forwarded to the connection server (277) located in a different region (1305), as illustrated in FIG. 25. Alternatively, a separate connection server can be position within the region (1307) to receive the calls to the call-in reference (1317) and then further connects the call to the connection server (277) in the region (1305).

In one embodiment, when there are multiple connection servers, the connection server (277) is located in a region (1305) of the callee, different from the region (1307) in which the call-in reference (1317) is a local reference. After the callee is identified, the call is connected from the connection server located in the region (1307) of the caller to the connection server (277) located in the region (1305) of the callee.

After the caller, callee and the payment information (1027) for the call are identified (e.g., via user interaction with the IVR prompts), the connection server (277) is configured to connect (1253) the call from the caller to the communication device (1019) of the callee.

In one embodiment, the connection server (277) is further configured to provide (1255) an indication of the region of the caller to the callee. To protect the privacy of the caller, the size of the region, in which the caller resides and which is identified to the callee, is determined such that they are at least a threshold number of callers have requested services in the same area. For example, the connection server (277) may dynamically reduce the size of the identified region of the caller according to a predetermined scale (e.g., country, state, country, city, zip code, neighborhood), until further reducing the size would identify the caller to be in a region having few than a threshold number of callers in the same region requesting similar services. Thus, the region (1307) of the caller identified to the callee includes at least a threshold number of callers requesting the same area of services (e.g., from the same callee, or from callees providing services in the same area and/or residing in the same region (e.g., 1305). The threshold may be determined by the system based on the area of services and/or in accordance with a preference of the caller.

In FIG. 25, the connection server (277) is configured to charge (1257) the caller on behalf of the callee for services provided by the callee over the connection and for telecommunications costs of connecting from the region (1307) of the caller to the callee.

In one embodiment, when different currencies are used in regions (1307 and 1305), the connection server (277) is configured to perform (1259) currency exchange in charging the caller. For example, the connection server (277) may charge the caller using the payment information (1027) using the local currency of the region (1307) of the caller and provide the funds to the callee in the local currency of the region (1305) of the callee.

In one embodiment, the connection server (277) is a computing apparatus having at least one microprocessor (303), and memory (308) storing instructions configured to instruct the at least one microprocessor (303) to perform the operations discussed above, such as associating (1243) call-in references (e.g., 1317, 1017) local to different regions with different language preferences (e.g., 1301), identifying regions in which callers reside (e.g., based on the IP addresses used by the mobile device (1001), location indicated by the mobile device (1001), the internet service provider used by the mobile device (1001), the location computed by a GPS receiver of the mobile device (1001), etc.), providing (1245) a listing of a callee to the callers in different regions (e.g., 1317, 1017), receiving (1249) the calls via the call-in references from the callers, customizing (1251) interactive voice response prompts presented in the calls based at least in part on the language preferences (e.g., 1301) associated with the call-in references (e.g., 1317) via which the calls are received, connecting the calls to the callee based on responses to the interactive voice response prompts, etc.

The listings presented to callers in different regions can be differently customized to include different call-in references (1317) for receiving calls from the callers, different prices of services provided by the callee via the calls connected to the callee, where the prices are determined based at least in part on the call-in references used to make the calls, and different user inputs about services, provided by the callee in prior calls, filtered according to regions in which the callers reside.

In one embodiment, the callee specifies a single price; and the prices provided in the listing to callers in different regions are computed based on the single price specified by the callee, currency exchange rates, and telecommunication costs for connecting the calls received via the call-in references to the callee.

In one embodiment, the listing provided to the caller in the region (1307) includes at least two call-in references (1317 and 1017) with different prices. The user may choose to call the call-in reference (1317) local to the region (1307) of the caller, or the call-in reference (1017) local or close to the region (1305) of the callee.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others.

The instructions may be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

In general, a machine readable medium is non-transitory and includes any mechanism that stores, transmits, and/or provides information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. A computer-implemented method comprising:
    associating, in a computing apparatus, a plurality of call-in references of a plurality of different regions with respective different language preferences, wherein each of the call-in references is local to a first one of the regions but not to at least a second one of the regions;
    identifying, by the computing apparatus, regions in which callers reside;
    providing, by the computing apparatus, listings of callees, the listing presented to the callers in different regions including:
        different call-in references for receiving calls from the callers; and
        different user inputs about services provided by the callees in prior calls filtered according to regions in which the callers reside;
    receiving, in the computing apparatus, the calls via the call-in references from the callers;
    customizing, by the computing apparatus, interactive voice response prompts presented during one or more of the calls to one or more respective callers based at least in part on the language preferences associated with the call-in references via which the calls are received; and
    connecting the calls to the callees based on responses to the interactive voice response prompts.

2. The method of claim 1, further comprising:
    determining patterns in calls made using the call-in references and language preferences of callers indicated in the calls made using the call-in references;
    wherein the customizing is further based on the patterns.

3. The methods of claim 1, further comprising:
    providing, by the computing apparatus, a listing of a callee to a plurality of customers in the different regions, wherein the listing presented to customers in each respective region is customized with a call-in reference associated with a language preference consistent with a language spoken by majority customers in the respective region.

4. The method of claim 3, further comprising:
    providing, by the computing apparatus, a first interactive voice response prompt to allow callers using the call-in reference to select a language for subsequent prompts, wherein customer selections provided in response to the first interactive voice response prompt are used to determine the language spoken by the majority customers in the respective region.

5. The method of claim 1, further comprising:
    receiving, by the computing apparatus, a single price for services provided by a callee;
    computing, by the computing apparatus, different prices for services provided by the callee to callers in the different regions, based at least in part on call-in references called by the callers for anonymous connects provided to the callee via the computing apparatus; and
    charging, by the computing apparatus, the callers in accordance with the prices.

6. The method of claim 5, wherein the prices include different telecommunication costs for connecting callers from the different regions to the caller.

7. The method of claim 5, wherein the prices include exchange rates between currencies used in the different regions and a currency used by the callee.

8. The method of claim 1, further comprising:
    identifying, by the computing apparatus, locations of callees of the calls to callers of the calls, in granularity determined in accordance with preferences of the callees.

9. The method of claim 1, further comprising:
    identifying, by the computing apparatus, locations of callees of the calls to callers of the calls, in granularity determined in accordance with service categories of the callees.

10. The method of claim 1, further comprising:
    identifying, by the computing apparatus, locations of callers of the calls to callees of the calls, in granularity determined in accordance with preferences of the callers.

11. The method of claim 1, further comprising:
    identifying, by the computing apparatus, locations of callers of the calls to callees of the calls, in granularity determined in accordance with service categories of the callees.

12. The method of claim 1, further comprising:
    identifying, by the computing apparatus, a location of a caller of a call to a callee of the call as being in a region in which there are more than a predetermined number of callers who has called the callee in a predetermined time period.

13. The method of claim 1, further comprising:
    identifying, by the computing apparatus, a location of a callee providing services of a category as being in a region in which there are more than a predetermined number of callees providing services in the category.

14. The method of claim 1, further comprising:
    filtering, by the computing apparatus according to a first location indicator, inputs provided by callers regarding services provided by a callee.

15. The method of claim 14, wherein the inputs are comments, feedback, or customer ratings.

16. The method of claim 14, wherein the first location indicator is a region selected by a caller to whom the filtered inputs are presented.

17. The method of claim 14, wherein the first location indicator is a region in which a caller resides; and the inputs are filtered for presentation to the caller.

18. A non-transitory computer-storage medium storing instructions configured to instruct a computing apparatus to at least:

associate, in the computing apparatus, a plurality of call-in references of a plurality of different regions with respective different language preferences, wherein each of the call-in references is local to a first one of the regions but not to at least a second one of the regions;

identify, by the computing apparatus, regions in which callers reside;

provide, by the computing apparatus, listings of callees, the listing presented to the callers in different regions including
- different call-in references for receiving calls from the callers, and
- different user inputs about services provided by the callees in prior calls filtered according to regions in which the callers reside;

receive, in the computing apparatus, the calls via the call-in references from the callers;

customize, by the computing apparatus, interactive voice response prompts presented during one or more of the calls to one or more respective callers based at least in part on the language preferences associated with the call-in references via which the calls are received; and connect the calls to the callees based on responses to the interactive voice response prompts.

19. A computing apparatus comprising:

at least one microprocessor, and memory storing instructions configured to instruct the at least one microprocessor to at least:

associate, in the computing apparatus, a plurality of call-in references of a plurality of different regions with respective different language preferences, wherein each of the call-in references is local to a first one of the regions but not to at least a second one of the regions;

identify, by the computing apparatus, regions in which callers reside;

provide, by the computing apparatus, a listing of a callee, the listing presented to the callers in different regions including different call-in references for receiving calls from the callers, different prices of services provided by the callee via the calls connected to the callee, the prices determined based at least in part on the call-in references used to make the calls, and different user inputs about services provided by the callee in prior calls filtered according to regions in which the callers reside;

receive, in the computing apparatus, the calls via the call-in references from the callers;

customize, by the computing apparatus, interactive voice response prompts presented during one or more of the calls to one or more respective callers based at least in part on the language preferences associated with the call-in references via which the calls are received; and connect the calls to the callee based on responses to the interactive voice response prompts.

20. The computing apparatus of claim 19, wherein the callee specifies a single price;

and the prices provided in the listing are computed based on the single price, currency exchange rates, and telecommunication costs for connecting the calls received via the call-in references to the callee.

* * * * *